US012705744B2

(12) United States Patent
Lavoie et al.

(10) Patent No.: US 12,705,744 B2
(45) Date of Patent: Aug. 11, 2026

(54) CLASSIFICATION AND IMPROVEMENT OF QUALITY OF VASCULAR IMAGES

(71) Applicant: 2438799 ALBERTA LTD., Calgary (CA)

(72) Inventors: Benjamin R. Lavoie, Calgary (CA); Rangaraj M. Rangayyan, Calgary (CA); Faraz Oloumi, Calgary (CA)

(73) Assignee: 2438799 ALBERTA LTD., Calgary (CA)

(*) Notice: Subject to any disclaimer, the term of this patent is extended or adjusted under 35 U.S.C. 154(b) by 389 days.

(21) Appl. No.: 18/575,636

(22) PCT Filed: Jun. 30, 2022

(86) PCT No.: PCT/CA2022/051047

§ 371 (c)(1),
(2) Date: Dec. 29, 2023

(87) PCT Pub. No.: WO2023/272395

PCT Pub. Date: Jan. 5, 2023

(65) Prior Publication Data

US 2024/0312016 A1 Sep. 19, 2024

(30) Foreign Application Priority Data

Jun. 30, 2021 (EP) .................................... 21182973

(51) Int. Cl.
*G06T 7/00* (2017.01)

(52) U.S. Cl.
CPC .. *G06T 7/0014* (2013.01); *G06T 2207/20048* (2013.01); *G06T 2207/30041* (2013.01);
(Continued)

(58) Field of Classification Search
None
See application file for complete search history.

(56) References Cited

U.S. PATENT DOCUMENTS 6,979,124 B2 * 12/2005 Gerwin .................. A61B 6/583 378/207
12,551,580 B2 * 2/2026 Liu .................... A61K 51/0459
(Continued)

FOREIGN PATENT DOCUMENTS

JP 2020/107969 7/2020
WO WO 2020/016836 1/2020

OTHER PUBLICATIONS

Abbas et al., "Features Preserving Contrast Improvement for Retinal Vascular Images," *International Journal of Innovative Computing, Information and Control*, vol. 9, No. 9, Sep. 2013, pp. 3731-3739.

(Continued)

*Primary Examiner* — Nancy Bitar
(74) *Attorney, Agent, or Firm* — Buscher Patent PLLC

(57) ABSTRACT

The invention relates to computer-implemented methods for classification of the quality of a vascular image comprising determining of a local spatial orientation and frequency variation, variation in brightness, global contrast, and vessel contrast. Provided are methods for correction of the quality of a vascular image, for classification of quality enhanceability of a vascular image, and for obtainment of a quality enhanced vascular image comprising at least one technique selected from the group of focus correction, illumination correction, and contrast correction. The invention further relates to a storage device, a server and/or a capturing system comprising the computer-implemented method of the invention.

20 Claims, 28 Drawing Sheets

(52) U.S. Cl.
CPC ............... *G06T 2207/30096* (2013.01); *G06T 2207/30101* (2013.01)

(56) References Cited

U.S. PATENT DOCUMENTS

| | | | | |
|---|---|---|---|---|
| 2002/0052551 | A1 | 5/2002 | Sinclair et al. | |
| 2022/0052551 | A1* | 2/2022 | Lee | H02J 3/007 |
| 2024/0394858 | A1* | 11/2024 | Park | G09G 5/02 |

OTHER PUBLICATIONS

Dehkordi et al., "A Review of Coronary Vessel Segmentation Algorithms," *Journal of Medical Signals & Sensors*, vol. 1, Issue 1, Jan.-Apr. 2011, pp. 49-54.
Kirbas et al., "A Review of Vessel Extraction Techniques and Algorithms," *ACM Computing Surveys*, vol. 36, No. 2, Jun. 2004, pp. 81-121.
Moccia et al., "Blood vessel segmentation algorithms—Review of methods, datasets and evaluation metrics," *Computer Methods and Programs in Biomedicine*, vol. 158, May 2018, pp. 71-91.

* cited by examiner

Note: Segmentation is done using a modified fuzzy region growing method. This method is designed to handle multiple adjacent regions via a provisional pixel assignement strategy.

Region membership values are obtained using fuzzy membership computed with a contrast function.

*On the first pass use 1/2 overall mean vessel width computed from full vessel map.

MinDist = Minimum distance from centre to edge of FOV.

FinalRad = Final desired radius of FOV.

d = fixed window width
or
d = c x MinDist/N

With c a scale factor to be determined by user/other means.

Retinal Image 1:
corresponding generated FOV mask 1:
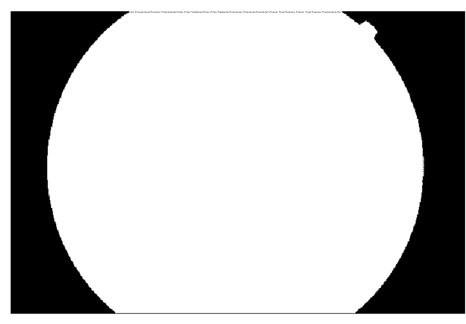
Retinal Image 2:
corresponding generated FOV mask 2:
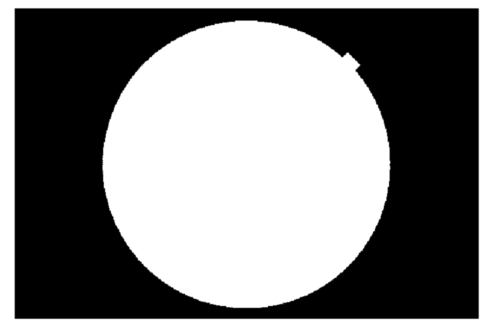
Fig. 15

Image segmented according to color:
Image segmented according to brightness:
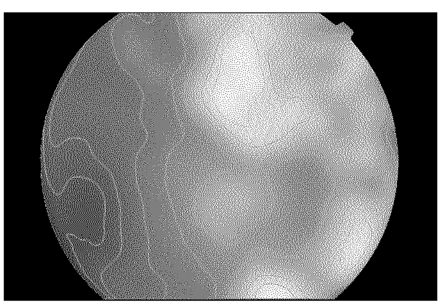
Image with FOV mask: Image with extended FOV mask:
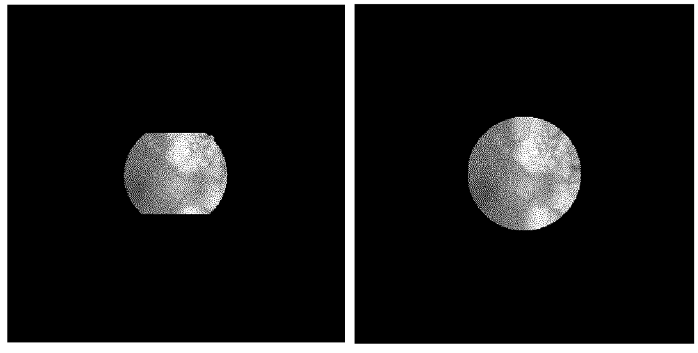
Brightness in extended
FOV mask:
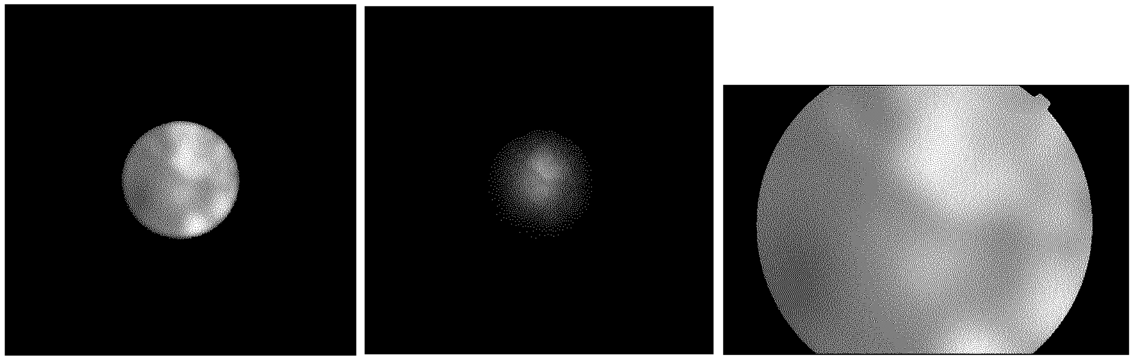
Fig. 17

Figure 18 A) Original Image A:
Enhanced Image A:

Figure 18 B) Original Image B:
Enhanced Image B:

A)
B)
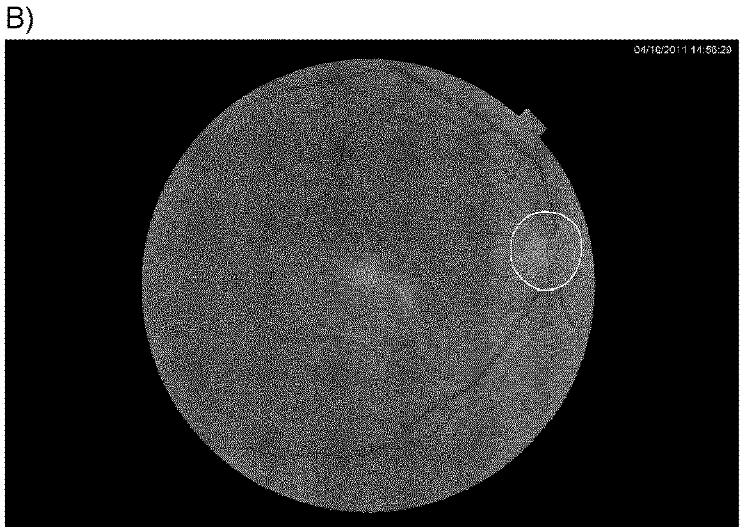
C)
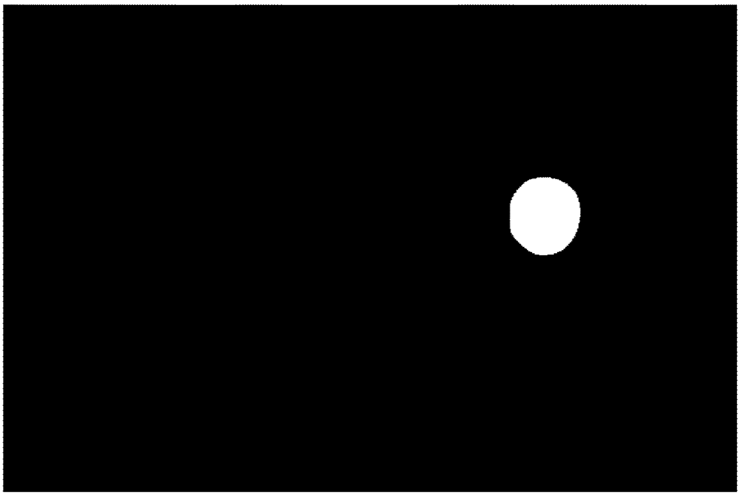
Fig. 21

A)
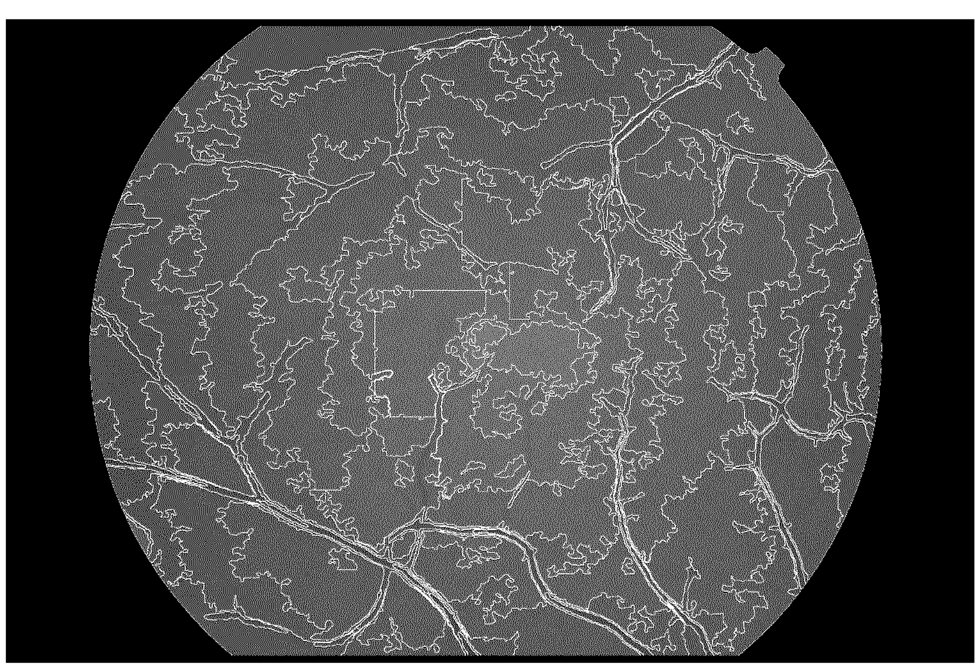
B)
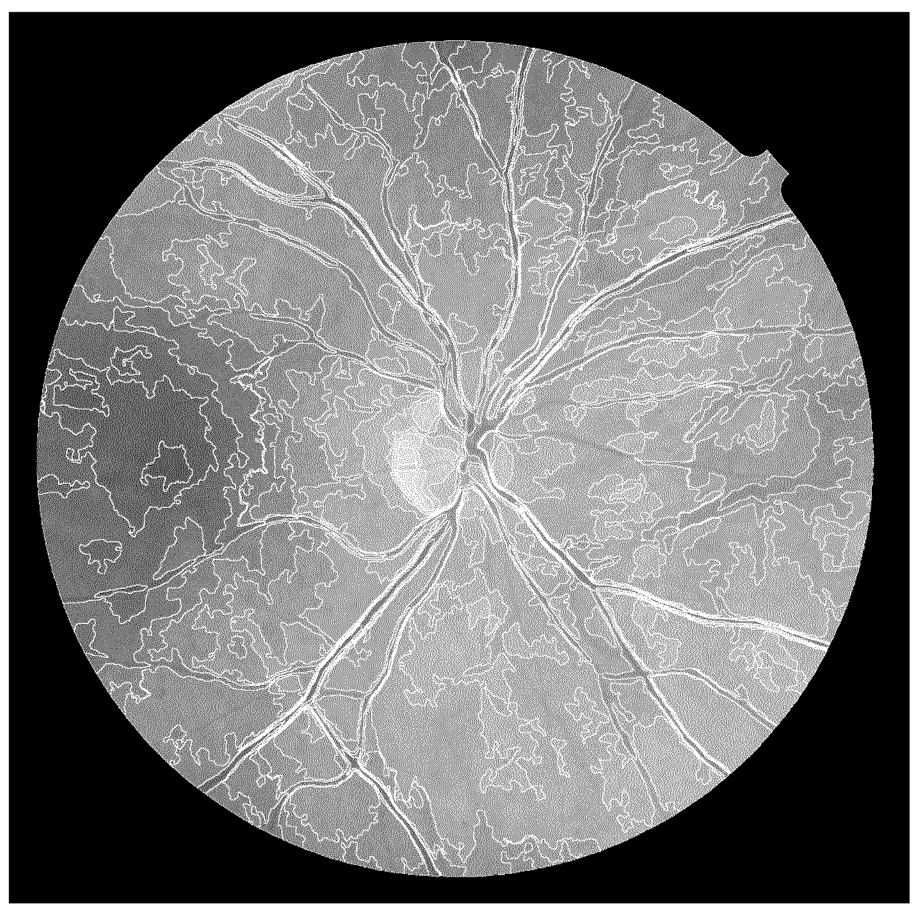
Fig. 22

CLASSIFICATION AND IMPROVEMENT OF QUALITY OF VASCULAR IMAGES

The invention relates to computer-implemented methods for classification of the quality of a vascular image comprising of determining of a local spatial orientation and frequency variation, variation in brightness, global contrast, and vessel contrast. Provided are methods for correction of the quality of a vascular image, for classification of quality enhanceability of a vascular image, and for obtainment of a quality enhanced vascular image comprising at least one technique selected from the group of focus correction, illumination correction, and contrast correction. The invention further relates to a storage device, a server and/or a capturing system comprising the computer-implemented method of the invention.

Vascular images enable direct inspection of blood vessels and pathology change through the whole body. Vascular images comprise information regarding risks of systemic diseases, such as atherosclerosis and local diseases such as retinal diseases. Vascular images are widely used for diagnosis and follow up treatments.

However, vascular images often have limitations resulting e.g. from the instruments or biological implications. Such limitations include low contrast (such as the contrast between vasculature and background), image noise, artefacts, incorrect focus, and non-uniform illumination. Vascular image quality is a critical requirement in a number of healthcare environments, including ophthalmology where studies and diagnostic suffer a loss of data due to poor quality images, for example, unusable and/or ungradable retinal images. This adversely affects the utility of images for diagnosis and treatment planning.

Recent developments in image correction algorithms broadened the possibilities of restoring image quality of specific lower quality images by quality enhancement. However, the possibilities and required methods of image enhancement depend on the individual image.

Nevertheless, these enhanceable vascular images represent a significant proportion of data that is ignored by current classification algorithms.

Thus, there is a need for improvement of the classification of vascular images such as retinal images.

The above technical problem is solved by the embodiments disclosed herein and as defined in the embodiments.

Accordingly, the invention relates to, inter alia, the following embodiments:

1. A computer-implemented method for classification of the quality of a vascular image, the method comprising the steps of:
   a. determining an image quality pattern of a vascular image based on a sharpness metric, a brightness metric, and a contrast metric of the vascular image, wherein the sharpness metric comprises determining in at least two areas in the vascular image a spatial orientation of edges and frequency variation, wherein frequency variation is the variation in at least a part of the frequency domain of the image, the brightness metric, wherein the brightness metric is indicative of brightness-derived quality parameters and comprises determining non-uniformity of the brightness of the image, and the contrast metric comprises determining a global contrast and determining the contrast of at least one vessel segment;
   b. comparing the image quality pattern obtained in (a) with a predefined image quality threshold pattern, wherein the quality threshold pattern comprises at least one threshold and/or a classification model comprising or consisting of a set of weights; and
   c. classifying the quality of the vascular image, wherein the image quality is classified based on the comparison of (b), in particular wherein the image quality is classified as having high quality if the image quality pattern is above the predefined image quality threshold pattern and wherein the image quality is classified as having low quality if the image quality pattern is below the predefined image quality threshold pattern.
2. A computer-implemented method for correction of the quality of a vascular image, the method comprising the steps of:
   i. retrieving a vascular image classified as having low quality according to the method of embodiment 1;
   ii. retrieving or determining a sharpness metric, a brightness metric, and a contrast metric of the vascular image, wherein the sharpness metric comprises determining of a spatial orientation and frequency variation of at least two areas in the vascular image, the brightness metric comprises comparing brightness values of the vascular image to a brightness reference image, and the contrast metric comprises determining a global contrast and determining the contrast of at least one vessel segment;
   iii. comparing the sharpness metric, the brightness metric, and/or the contrast metric to an enhancement threshold pattern;
   iv. correcting the quality of the vascular image by employing, at least one technique selected from the group of focus correction, illumination correction, and contrast correction; wherein the selection of the technique is based on the comparison in step ii).
3. A computer-implemented method for classification of quality enhanceability of a vascular image, the method comprising the steps of:
   i. retrieving a vascular image that is corrected according to the method of embodiment 2;
   ii. determining a corrected image quality pattern of the corrected vascular image based on a sharpness metric, a brightness metric, and a contrast metric of the corrected vascular image, wherein the sharpness metric comprises determining a spatial orientation and frequency variation of at least two areas in the vascular image, the brightness metric comprises comparing the brightness values of the corrected vascular image to a brightness reference image; and the contrast metric comprises determining global contrast and determining the contrast of at least one vessel segment;
   iii. comparing the difference between the corrected image quality pattern and the image quality pattern to an enhanceability threshold pattern; and
   iv. classifying quality enhanceability of the vascular image, wherein the vascular image is classified based on the comparison of (iii), in particular wherein the vascular image is classified as enhanceable if the difference in step iii) is above the enhanceability threshold pattern and wherein the vascular image is classified as not enhanceable if the difference in step iii) is below the enhanceability threshold pattern.
4. A computer-implemented method for classification of the quality of a vascular image, the method comprising the steps of:
   I. classifying the quality of a vascular image according to the method of embodiment 1;

II. correcting the quality of the vascular image according to the method of embodiment 2, if the vascular image is classified as having low quality according to step I.;

III. classifying the quality of the corrected vascular image according to the method of embodiment 1, if the vascular image is classified as having low quality according to step I.; and IV. classifying the vascular image as having good quality if the vascular image and/or the corrected vascular image are/is classified as having high quality.

5. The computer-implemented method of embodiment 4, the method comprising the steps of:

1) classifying quality enhanceability of the corrected vascular image according to the method of embodiment 3, if the vascular image classified as having low quality according to step I.; and 2) classifying the vascular image as having enhanceable quality if the vascular image and the corrected vascular image are determined as having low quality and the corrected vascular image is classified as enhanceable in step 1).

6. The computer-implemented method of embodiment 4 or 5, the method further comprising the steps of:

I. classifying quality enhanceability of the corrected vascular image according to the method of embodiment 3; and II. correcting the quality of the corrected vascular image according to the method of embodiment 2 if the corrected vascular image is classified as enhanceable in step IV) and repeating the correction of the corrected vascular image quality image according to the method of embodiment 2, the classification of the quality of the corrected vascular image according to the method of embodiment 1 and the classification of the quality enhanceability of the corrected vascular image according to the method of embodiment 3 until the corrected vascular image is not classified as enhanceable according to the method of embodiment 3.

7. A computer-implemented method for obtainment of a quality enhanced vascular image, the method comprising the steps of:

i. correcting the quality of a vascular image according to the method of embodiment 2;

ii. classifying quality in the corrected vascular image according to the method of embodiment 1;

iii. obtaining the quality enhanced vascular image by storing the corrected vascular image if the image is classified as having high quality in step ii).

8. The computer-implemented method of embodiment 7, the method further comprising the steps of:

1. classifying quality enhanceability of the corrected vascular image according to the method of embodiment 3 if the corrected vascular image is classified as having low quality in step ii);

2. correcting the quality of the corrected vascular image according to the method of claim 2 and repeating the correction if the corrected vascular image remains being classified as enhanceable.

9. The computer-implemented method for classification according to any one of the embodiments 1, 3 to 6, the computer-implemented method for correction according to embodiment 2 or the computer-implemented method for obtainment according to embodiment 7 or 8, wherein the brightness metric determination comprises the steps of:

a) segmentation of the vascular image;

b) comparison of a segment to a segment reference pattern; and c) determining based whether the brightness of the segment is indicative of anatomical brightness or quality-related brightness alterations.

10. The computer-implemented method for classification according to embodiment 9, the computer-implemented method for correction according to embodiment 9 or the computer-implemented method for obtainment according to embodiment 9, wherein the segment is a segment with having an abnormal brightness level, wherein a abnormal brightness level is a brightness level below a minimal brightness threshold value or a brightness level above a maximal brightness threshold value.

11. The computer-implemented method for classification according to embodiment 9 or 10, the computer-implemented method for correction according to embodiment 9 or 10 or the computer-implemented method for obtainment according to embodiment 9 or 10, wherein the brightness metric comprises the segmentation of the vascular image comprises using a fuzzy membership function and/or region growing segmentation.

12. The computer-implemented method for classification according to any one of the embodiments 1, 3 to 6, 9 to 11, the computer-implemented method for correction according to embodiment 2, 9 to 11 or the computer-implemented method for obtainment according to any one of embodiments 7 to 11, wherein the brightness metric comprises homomorphic filtering.

13. The computer-implemented method for classification according to any one of the embodiments 1, 3 to 6, 9 to 12, the computer-implemented method for correction according to embodiment 2, 9 to 12 or the computer-implemented method for obtainment according to any one of embodiments 7 to 12 wherein the brightness metric comprises comparing at least part of the brightness metrics of the vascular image to a brightness reference image, preferably comparing the radial spectral power density to a reference image.

14. The computer-implemented method for classification according to any one of the embodiments 1, 3 to 6, 9 to 13, the computer-implemented method for correction according to any one of the embodiments 2, 9 to 13 or the computer-implemented method for obtainment according to any one of the embodiments 7 to 13, wherein the brightness metric comprises determining a Fourier transformation of the of the vascular image, wherein a frequencies above a Fourier transformation frequency threshold contribute more to the brightness metric than the frequencies below the Fourier transformation frequency threshold, preferably wherein frequencies below the Fourier transformation frequency threshold are excluded from the brightness metric computation.

15. The computer-implemented method for classification according to embodiment 14, the computer-implemented method for correction according to embodiment 14, or the computer-implemented method for obtainment according to embodiment 14, wherein the brightness metric comprises determining at least one brightness metric selected from the group of angular spectral power density, image moment, histogram metric and radial spectral power density.

16. The computer-implemented method for classification according to any one of the embodiments 1, 3 to 6, 9 to 15, the computer-implemented method for correction according to any one of the embodiments 2, 9 to 15, or the computer-implemented method for obtainment according to any one of the embodiments 7 to 15, wherein determining the contrast metric comprises comparison of the intensity distributions of a foreground and a background region.
17. The computer-implemented method for classification according to embodiment 16, the computer-implemented method for correction according to embodiment 16 or the computer-implemented method for obtainment according to embodiment 16, or the computer-implemented method for obtainment according to embodiment 16, wherein the foreground region of the vessel contrast are the vessels and the background regions of the vessel contrast are regions adjacent to the vessels, wherein each foreground region has a corresponding background region with at least 50% of the area of the foreground region, preferably wherein each background region covers all borders of the foreground region.
18. The computer-implemented method for classification according to embodiment 16 or 17, the computer-implemented method for correction according to embodiment 16 or 17 or the computer-implemented method for obtainment according to embodiment 16 or 17, or the computer-implemented method for obtainment according to embodiment 16 or 17, wherein determining the contrast metric comprises determining a Jeffries Matusita Distance and/or Jensen-Shannon Divergence between the foreground and the background region.
19. The computer-implemented method for classification according to any one of the embodiments 1, 3 to 6, 9 to 18, the computer-implemented method for correction according to any one of the embodiments 2, 9 to 18, or the computer-implemented method for obtainment according to any one of the embodiments 7 to 18, wherein global contrast is determined using at least 50% of the pixels of the image.
20. The computer-implemented method for classification according to any one of the embodiments 1, 3 to 6, 9 to 19, the computer-implemented method for correction according to any one of the embodiments 2, 9 to 19, or the computer-implemented method for obtainment according to any one of the embodiments 7 to 19, wherein determining the contrast metric comprises determining superpixel segments, and/or lesion segments.
21. The computer-implemented method for classification according to embodiment 20, the computer-implemented method for correction according to embodiment 20, or the computer-implemented method for obtainment according to embodiment 20, wherein the superpixel segments are non-overlapping clusters of pixels clustered based on
    a) color similarity or intensity similarity; and
    b) distance from a seed pixel.
22. The computer-implemented method for classification according to embodiment 21, the computer-implemented method for correction according to embodiment 21 or the computer-implemented method for obtainment according to embodiment 21, wherein the foreground regions are superpixel segments and the background regions are regions adjacent to the foreground region, wherein each foreground region has a corresponding background region with at least 50% of the area of the foreground region, preferably wherein each background region covers all borders of the foreground region.
23. The computer-implemented method for classification according to any one of the embodiments 1, 3 to 6, 9 to 22, the computer-implemented method for correction according to any one of the embodiments 2, 9 to 22, or the computer-implemented method for obtainment according to any one of the embodiments 7 to 22, wherein determining at least one vessel segment comprises determining a response of a Gabor filter.
24. The computer-implemented method for classification according to any one of the embodiments 1, 3 to 6, 9 to 23, the computer-implemented method for correction according to any one of the embodiments 2, 9 to 23, or the computer-implemented method for obtainment according to any one of the embodiments 7 to 23, wherein the Laplacian Energy of at least one vessel segment and/or in at least one lesion segment is determined.
25. The computer-implemented method for classification according to any one of the embodiments 1, 3 to 6, 9 to 24, the computer-implemented method for correction according to any one of the embodiments 2, 9 to 24, or the computer-implemented method for obtainment according to any one of the embodiments 7 to 24, wherein sharpness metric comprises determining a Fourier transformation of the vascular image, wherein a band of frequency of the fourier transform contributes more to the sharpness metric than the frequencies higher and lower than the band of frequency of the fourier transform, preferably wherein frequencies higher and lower than the band of frequency of the fourier transform are excluded from sharpness metric computation.
26. The computer-implemented method for classification according to embodiment 25, the computer-implemented method for correction according to embodiment 25, or the computer-implemented method for obtainment according to embodiment 25, wherein the sharpness comprises at least one sharpness metric selected from the group of L* channel metric, angular spectral power density, and radial spectral power density, wherein the L* channel the L* channel of the CIELAB colour space and wherein the angular spectral power density and radial spectral power density are determined from the frequency response on the vascular image.
27. The computer-implemented method for classification according to embodiment 26, the computer-implemented method for correction according to embodiment 26, or the computer-implemented method for obtainment according to embodiment 26, wherein the radial spectral power density is used to determine generalized extreme value distribution.
28. The computer-implemented method for classification according to embodiment 26 or 27, the computer-implemented method for correction according to embodiment 26 or 27, or the computer-implemented method for obtainment according to embodiment 26 or 27, wherein the radial spectral power density is used to determine fractional power in at least one vessel segment.

29. The computer-implemented method for classification according to any of the embodiments 26 to 28, the computer-implemented method for correction according to any of the embodiments 26 to 28, or the computer-implemented method for obtainment according to any of the embodiments 26 to 28, wherein the L* channel metric is an L* channel-derived Form Factor and/or L* channel-derived Laplacian Energy, wherein the L* channel-derived Form Factor is a measure of the relative L* channel variation between a 2D spatial signal and its first and second derivatives and wherein the Laplacian Energy is a measure of content in a high-frequency band of the image.
30. The computer-implemented method for classification according to any one of the embodiments 1, 3 to 6, 9 to 29, the computer-implemented method for correction according to any one of the embodiments 2, 9 to 29 or the computer-implemented method for obtainment according to any one of the embodiments 7 to 29, wherein the vascular image is a retinal image.
31. The computer-implemented method for classification according to embodiment 30, the computer-implemented method for correction according to embodiment 30, or the computer-implemented method for obtainment according to embodiment 30, wherein the sharpness metric, the brightness metric, and/or the contrast metric is/are determined in a field of view mask area of the retinal image.
32. The computer-implemented method for classification according to embodiment 31, the computer-implemented method for correction according to embodiment 31 or the computer-implemented method for obtainment according to embodiment 31, wherein the method comprises a step of extending the field of view mask area.
33. The computer-implemented method for classification according to any one of the embodiments 30 to 32, the computer-implemented method for correction according to any one of the embodiments 30 to 32, or the computer-implemented method for obtainment according to any one of the embodiments 30 to 32, wherein the contrast metric comprises determining an optic nerve head segmentation.
34. A storage device comprising in form of computer executable instructions the computer-implemented method for classification according to any one of the embodiments 1, 3 to 6, 9 to 33, the computer-implemented method for correction according to any one of the embodiments 2, 9 to 33 and/or the computer-implemented method for obtainment according to any one of the embodiments 7 to 33.
35. A server comprising the storage device of embodiment 34 and at least one processing device capable of executing computer execution instructions and a network connection for receiving data indicative for the vascular image.
36. A system for capturing a quality-classified vascular image, wherein the system comprises
    a) an image capturing device; and
    b) i) at least one processing device capable of executing computer execution instructions and the storage device of embodiment 34; and/or
        ii) a network connection to a server according to embodiment 35.

Accordingly, in one embodiment, the invention relates to a computer-implemented method for classification of the quality of a vascular image, the method comprising the steps of: a. determining an image quality pattern of a vascular image based on a sharpness metric, a brightness metric, and a contrast metric of the vascular image, wherein the sharpness metric comprises determining in at least two areas in the vascular image a spatial orientation of edges and frequency variation, wherein frequency variation is the variation in at least a part of the frequency domain of the image, the brightness metric, wherein the brightness metric is indicative of brightness-derived quality parameters and comprises determining non-uniformity of the brightness of the image, and the contrast metric comprises determining a global contrast and determining the contrast of at least one vessel segment; b. comparing the image quality pattern obtained in (a) with a predefined image quality threshold pattern, wherein the quality threshold pattern comprises at least one threshold and/or a classification model comprising or consisting of a set of weights; and c. classifying the quality of the vascular image, wherein the image quality is classified based on the comparison of (b), in particular wherein the image quality is classified as having high quality if the image quality pattern is above the predefined image quality threshold pattern and wherein the image quality is classified as having low quality if the image quality pattern is below the predefined image quality threshold pattern.

The term "vascular image", as used herein, refers to any image of vascularized tissue of a subject. A vascularized tissue described herein is a tissue that comprises vessels that can carry blood or other liquids. In some embodiments, the vascularized tissue described herein is an organ or part of an organ selected from the group of eye, heart, brain, lung, kidney, liver, pancreas, and spleen. A vascular image can be in the format of, but is not limited to, a JPEG image, a PNG image, a GIF image, a TIFF image, or any other digital image format known in the art. In some embodiments, the vascular image described herein is an uncompressed vascular image. In some embodiments, the vascular image described herein is a compressed vascular image. "Image" is used herein interchangeably with "photograph". In some embodiments, the vascular image described herein comprises values associated with red, green, and blue (RGB) image contributions; cyan, blue, and magenta values (CMB); hue, saturation, lightness (brightness) (HSL); hue, saturation, and value (HSV); lightness "L", green-magenta "A", and blue-yellow "B" (LAB); or other values such as YCbCr; or Y'CbCr. In some embodiments, the vascular image described herein is part of a series of images, a video and/or a (live) stream of an imaging instrument. In some embodiments, the vascular image comprises additional data referring to parameters of the subjects and/or parameters of a disease of a subject. Such vascular images are typically obtained by capturing the vascularized tissue with a visible, infrared, or other capture device, typically a camera. In some embodiments, the vascular image represents a distribution of electromagnetic radiation at an image plane formed by an imaging lens.

The term "image quality pattern", refers to a pattern indicative of the image quality of the vascular image. A "pattern", as used herein refers to at least one selected from the group of score, metric, value, category, vector, matrix and classification. In some embodiments, the image quality pattern comprises at least one measure indicative of quality of sharpness, brightness and contrast. In some embodiments, the image quality pattern comprises at least one measure indicative for quality of sharpness, brightness, contrast and overall image quality. In some embodiments, the image quality pattern described herein is a trained linear discriminant classifier that via training, determines certain boundaries that will separate the quality of images into classes.

The terms "sharpness metric", "contrast metric" and "brightness metric" refer to metrics that are determined based on the sharpness, contrast and brightness of the image.

The term "sharpness", as used herein, refers to the clarity of the image in terms of both focus and edge contrast. When the subject of an image is sharp the image appears clear, with detail, edge contrast and texture rendered in high detail. In some embodiments, the sharpness described herein is determined or partially determined as described by the 1.1.3. Sharpness Assessment module (see, e.g., FIG. 7). In some embodiments, the sharpness described herein is determined or partially determined as described by the 1.1.3. Sharpness Assessment module (see, e.g., FIG. 7) and the 1.1.3.1. Extract Sharpness Component Module (see, e.g., FIG. 12). In some embodiments, the sharpness metric described herein is computed based on at least 1, at least 2, at least 3, at least 4, at least 5, or all metrics selected from the group consisting of: Form Factor; Laplacian Energy; Histogram metric, Angular Power Spectral Density metric, Radial Power Spectral Density metric and Generalized Extreme Value Distribution metric. In some embodiments, the sharpness metric described herein is determined based on at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, or all metrics selected from the group consisting of: Form Factor, Laplacian Energy, Histogram Mean, Histogram Standard Deviation, Histogram Coefficient of Variation, Histogram Skewness, Histogram Kurtosis, Angular Power Spectral Density Mean, Angular Power Spectral Density Entropy, Angular Power Spectral Density Variance, Angular Power Spectral Density Skewness, Radial Power Spectral Density Mean, Radial Power Spectral Density Median, Radial Power Spectral Density Entropy, Radial Power Spectral Density Variance, Radial Power Spectral Density Skewness, Radial Power Spectral Density Kurtosis, Radial Power Spectral Density Fractional Power, Generalized Extreme Value Distribution Mu, Generalized Extreme Value Distribution Sigma and Generalized Extreme Value Distribution Xi.

The term "brightness", as used herein, refers to the attribute of a pixel that appears to emit more or less light upon visual perception. In some embodiments, the brightness described herein is the arithmetic mean of the red, green, and blue color coordinates. In some embodiments, the brightness described herein is a color coordinate in HSL color space. "brightness" and "luminance" are used herein interchangeably. In some embodiments, the brightness described herein is determined or partially determined as described by the 1.1.1. Brightness Assessment (see, e.g., FIG. 5). In some embodiments, the brightness described herein is determined or partially determined as described by the 1.1.1. Brightness Assessment (see, e.g., FIG. 5) and the 1.1.1.1. Extract Brightness Component Module (see, e.g., FIG. 8). In some embodiments, the brightness described herein is determined or partially determined as described by the 1.1.1. Brightness Assessment (see, e.g., FIG. 5) and 1.1.1.2. Brightness Segmentation Module-Region Growing (see, e.g., FIG. 9). In some embodiments, the brightness described herein is determined or partially determined as described by the 1.1.1. Brightness Assessment (see, e.g., FIG. 5) and the 1.1.1.1. Extract Brightness Component Module (see, e.g., FIG. 8) and the 1.1.1.2. Brightness Segmentation Module-Region Growing (see, e.g., FIG. 9). In some embodiments, the brightness described herein is determined or partially determined as described by the 1.1.1. Brightness Assessment (see, e.g., FIG. 5) and the 1.1.1.1. Extract Brightness Component Module (see, e.g., FIG. 8) and the 1.1.1.2. Brightness Segmentation Module-Region Growing (see, e.g., FIG. 9) and the 1.1.1.1.1. FOV Extend Module (see, e.g., FIG. 13). In some embodiments, determination of the brightness metric comprises homomorphic filtering, preferably homomorphic filter wherein the lower-frequency components are extracted or higher weighted for further processing. This enables assessing brightness non-uniformity. In some embodiments, the brightness metric is determined from at least 50%, at least 60%, at least 70%, at least 80%, at least 90% or at least 95% of the pixels of the image or of the field of view mask. In some embodiments, the brightness metric described herein is computed based on at least 1, at least 2, at least 3, at least 4, at least 5, at least 6, at least 7, at least 8, at least 9, at least 10, or all metrics selected from the group consisting of: Histogram metric, Laplacian Energy, Root Mean Squared Distance From Mean, Cartesian Moment, Legendre Moment, Real Zernike Moment, Imaginary Zernike Moment, Angular Power Variation, Radon Transform Power Variation, Angular Power Spectral Density Entropy and Radial Power Spectral Density Entropy. In some embodiments the brightness metric is indicative of the brightness-related content of at least 50%, at least 60%, at least 70%, at least 80%, at least 90% or at least 95% the pixels in an vascular image or in the field of view mask thereof.

The term "contrast", as used herein, refers to the difference in luminance and/or color that makes a representation of an object on an image distinguishable. In some embodiments, the contrast described herein is calculated according to Weber contrast. In some embodiments, the contrast described herein is calculated according to Michelson contrast. In some embodiments, the contrast described herein is calculated according to RMS contrast. In some embodiments, the contrast is determined or partially determined as described by the 1.1.2. Contrast Assessment (see, e.g., FIG. 6). In some embodiments, the contrast is determined or partially determined as described by the 1.1.2. Contrast Assessment (see, e.g., FIG. 6) and the 1.1.2.1. Superpixel Module (see, e.g., FIG. 10). In some embodiments, the contrast is determined or partially determined as described by the 1.1.2. Contrast Assessment (see, e.g., FIG. 6) and the 1.1.2.2. Vessel Detection Module (see, e.g., FIG. 11). In some embodiments, the contrast is determined or partially determined as described by the 1.1.2. Contrast Assessment (see, e.g., FIG. 6) and the 1.1.2.1. Superpixel Module (see, e.g., FIG. 10) and the 1.1.2.2. Vessel Detection Module (see, e.g., FIG. 11). In some embodiments, the contrast is determined or partially determined as described by the 1.1.2. Contrast Assessment (see, e.g., FIG. 6) and the 1.1.2.1. Superpixel Module (see, e.g., FIG. 10) and the 1.1.2.2. Vessel Detection Module (see, e.g., FIG. 11) and the 1.1.2.2.1. Multi-Scale Gabor Module (see, e.g., FIG. 14). In some embodiments, the global contrast is determined from at least 50%, at least 60%, at least 70%, at least 80%, at least 90% or at least 95% of the pixels of the image or of the field of view mask.

The term "predefined image quality threshold pattern", as us herein, refers to a predefined pattern comprising at least one threshold to determine the sufficiency of image quality. In some embodiments, the predefined image quality threshold pattern comprises more than one threshold. In some embodiments, the predefined image quality threshold pattern comprises at least one threshold for indicative for quality of at least one measure selected from the group of sharpness, brightness and contrast. In some embodiments, the predefined image quality threshold pattern comprises at least one threshold for indicative for quality of at least one measure selected from the group of sharpness, brightness, contrast, and overall image quality (see e.g. FIG. 3).

In some embodiments, the predefined image quality threshold pattern comprises values that can be amended to obtain images and/or classes of images of a certain quality by the methods described herein. In some embodiments, the predefined image quality threshold pattern comprises a threshold to obtain an image and/or at least one class of images by the methods described herein to have sufficient quality for grading and/or diagnosis of at least one indication selected from the group consisting of stroke, subclinical brain lesion, white matter lesion, dementia, hypertension, diabetes, cardiovascular diseases (e.g., coronary heart disease and cerebral vascular disease), glaucoma, prematurity, papilledema, and common retina disease (e.g., macular hole, age-related macular degeneration).

In some embodiments, the threshold for high quality for the diagnosis of at least one indication described herein is determined by estimation of the threshold value. In some embodiments, a machine learning technique is used to predefine the image quality threshold pattern described herein. The term "machine-learning technique", as used herein, refers to a computer-implemented technique that enables automatic learning and/or improvement from an experience (e.g., training data and/or obtained data) without the necessity of explicit programming of the lesson learned and/or improved. In some embodiments, the machine learning technique comprises at least one technique selected from the group of Logistic regression, CART, Bagging, Random Forest, Gradient Boosting, Linear Discriminant Analysis, Gaussian Process Classifier, Gaussian NB, Linear, Lasso, Ridge, ElasticNet, partial least squares, KNN, DecisionTree, SVR, AdaBoost, GradientBoost, neural net and ExtraTrees. In some embodiments, a supervised machine learning technique is used to predefine the image quality threshold pattern described herein. In some embodiments, the supervised machine learning technique described herein is trained and/or validated using data labeled by at least one person qualified to diagnose the relevant indication (e.g. retinal images labeled by at least one ophthalmologist for sufficient/insufficient quality to diagnose e retinal disease). In some embodiments, the threshold for sufficient quality for the diagnosis of at least one indication described herein is the threshold above which images are considered gradable for the characteristics of the indication.

The term "brightness reference image", as used herein, refers to an image that enables the normalization of brightness between images. In some embodiments, the brightness reference image described herein is an image with uniform brightness. In some embodiments, the brightness reference image described herein is an image with ideal image (i.e. an all-white image).

The term "global contrast", as us herein, refers to the overall contrast between larger areas of the vascular image. In some embodiments, the global contrast described herein is the contrast of larger areas within a field of view mask area. In some embodiments, the global contrast is determined by applying a super pixel method. In some embodiments the global contrast is indicative of the contrast related content of at least 50%, at least 60%, at least 70%, at least 80%, at least 90% or at least 95% of the pixels in an vascular image or in the field of view mask thereof.

The term "vessel segment", as used herein, refers to an area that represents at least one vessel. In some embodiments, the vessel referred to herein is at least one vessel selected from the group of blood vessels, arteries, arterioles, capillaries, venules, sinusoids, and lymphatic vessels. Vessel segmentation can be achieved by any method known in the art (see, e.g., Moccia, S., et al., 2018, Computer methods and programs in biomedicine, 158, 71-91; Dehkordi, et al., 2011, Journal of medical signals and sensors, 1(1), 49; Kirbas, C., & Quek, F., 2004, ACM Computing Surveys (CSUR), 36(2), 81-121.). In some embodiments, the vessels are segmented using at least one method described in 1.1.2.2. Vessel Detection Module (see, e.g., FIG. 11). In some embodiments, the vessel is labeled (e.g., by a radioactive label or a fluorescent label) and/or highlighted (e.g., by a contrast agent). Large vessels comprise more image quality-related and contrast-related information than small vessels. In some embodiments, the vessel detection module aims for detection of larger vessels compared to smaller vessels.

The local spatial orientation and frequency variation comprise relevant information about distinguishable elements on the vascular image and are therefore reflecting sharpness-related image quality metric particularly well.

The comparison to the reference brightness image normalizes brightness or aspects of brightness between the vascular images to be classified. This process enables a standardized comparison of the brightness metric between the images.

Global contrast of the vascular image is a central metric for image quality. For example, low contrast on vascular images can reduce the distinguishability of elements that are relevant for image grading and diagnosing.

The vessels on the vascular image comprise significant biological and diagnostic information. The vessel-related contrast can be different than the global contrast. Therefore, the properties and/or the image quality of the vessel segment is particularly relevant for subsequent grading and/or diagnosing. In some embodiments, at least one property of the vessel segment(s) influence(s) the image quality score. In some embodiments, the property of the vessel segment(s) is at least one property selected from the group of form, size, vessel density, length, and tortuosity. Abnormal vessels may serve as an indicator for a pathology and therefore facilitate gradability. Reduced contrast of the vessels may therefore particularly influence the image quality score.

In some embodiments, the methods described herein classify the quality of a vascular image in additional categories. For example, such additional categories may comprise very poor quality, adequate quality, very good quality. In some embodiments, the additional categories determine whether an image is further processed or excluded. In some embodiments, the additional categories determine whether or not an image should be preferred over an equivalent image (e.g., of the same patient).

In some embodiments, the methods described herein classify the quality of a vascular image in real-time. In some embodiments, the methods described herein give the photographer recommendations for correcting technical errors in the acquisition of the photograph based on the classification of the image.

The threshold patterns employed in the invention (e.g., predefined image quality threshold pattern, enhanceability threshold pattern, segment reference pattern) enable efficient and standardization assessment. The means and methods of the present invention can minimize subjectivity and bias compared to existing methods and/or algorithms.

The combined determination of local spatial orientation and frequency variation, variation in brightness, global contrast and vessel contrast gives a comprehensive indication of image quality and enables high classification accuracy (Example 1). Furthermore, the method described herein does not require one specific objective measure for any image-quality feature, but determines the overall image quality. Furthermore, the determination is independent of the image orientation and can be independent of the location of anatomical entities that are used by methods known in the art for orientation, such as the optical nerve head.

Accordingly, the invention is at least in part based on the discovery, that quality classification of quality of a vascular image is particularly standardized and accurate by the combined determination of local spatial orientation and frequency variation, variation in brightness, global contrast and vessel contrast.

In some embodiments, the quality threshold pattern comprises enables classification in three or more categories. These three categories may comprise for example "good quality", "bad quality" and "low quality", wherein the "low quality" is indicative of further processing (such as further quality determination and/or quality enhancement) and wherein "bad quality" is not considered for further processing. In some embodiments, one of the categories is indicative of sub ideal quality, wherein sub ideal quality is indicative of acceptable but potentially enhanceable quality.

In certain embodiments, the invention relates to a computer-implemented method for classification of the quality of a vascular image, the method comprising the steps of: a. determining an image quality pattern of a vascular image based on a sharpness metric, a brightness metric, and a contrast metric of the vascular image, wherein the sharpness metric comprises determining of a spatial orientation and frequency variation of at least two areas in the vascular image, the brightness metric comprises comparing brightness values of the vascular image to a brightness reference image, and the contrast metric comprises determining a global contrast and determining the contrast of at least one vessel segment; b. comparing the image quality pattern obtained in (a) with a predefined image quality threshold pattern; and c. classifying the quality of the vascular image, wherein the image quality is classified based on the comparison of (b), in particular wherein the image quality is classified as having high quality if the image quality pattern is above the predefined image quality threshold pattern and wherein the image quality is classified as having low quality if the image quality pattern is below the predefined image quality threshold pattern.

In certain embodiments, the invention relates to a computer-implemented method for correction of the quality of a vascular image, the method comprising the steps of: i. retrieving a vascular image classified as having low quality according to the method of the invention; ii. retrieving or determining a sharpness metric, a brightness metric, and a contrast metric of the vascular image, wherein the sharpness metric comprises determining of a spatial orientation and frequency variation of at least two areas in the vascular image, the brightness metric comprises comparing brightness values of the vascular image to a brightness reference image, and the contrast metric comprises determining a global contrast and determining the contrast of at least one vessel segment; iii. comparing the sharpness metric, the brightness metric, and/or the contrast metric to an enhancement threshold pattern; iv. correcting the quality of the vascular image by employing, at least one technique selected from the group of focus correction, illumination correction, and contrast correction; wherein the selection of the technique is based on the comparison in step ii).

In certain embodiments, the invention relates to a computer-implemented method for correction of the quality of a vascular image, the method comprising the steps of: i. retrieving a vascular image classified as having low quality according to the method of the invention; ii. comparing the sharpness metric, the brightness metric, and/or the contrast metric to an enhancement threshold pattern; iii. correcting the quality of a vascular image by employing, at least one technique selected from the group of focus correction, illumination correction, and contrast correction; wherein the selection of the technique is based on the comparison in step ii).

The term "correcting", as used herein, refers to altering at least one metric of an image, wherein the metric has been determined to indicate low quality, by a least one correction method selected from the group of focus correction, illumination correction and contrast correction (see e.g., FIG. 4). In some embodiments, the correction described herein comprises at least one technique selected from spatial domain method, point processing operation, and histogram processing. In some embodiments, the "low" quality described herein is "insufficient" quality and/or the "high" quality described herein is "sufficient" quality.

The term "focus correction", as used herein, refers to a method that alters sharpness. In some embodiments, the focus correction described herein comprises at least one technique selected from unsharp masking, frequency domain high emphasis and adaptive bilateral filtering.

The term "illumination correction", as used herein, refers to a method that alters brightness. In some embodiments, the illumination correction described herein comprises at least one technique selected from homomorphic filters, gamma correction and framelet regularization The term "contrast correction", as used herein, refers to a method that alters contrast. In some embodiments, the contrast correction described herein comprises at least one technique selected from the group of histogram equalization and fuzzy-contextual contrast enhancement.

The term "enhancement threshold pattern", as used herein, refers to a pattern comprising at least one threshold to determine which correction technique should be applied. In some embodiments, the enhancement threshold pattern described herein comprises at least one threshold for the sharpness metric, at least one threshold for the brightness metric, and at least one threshold for the contrast metric.

The selection of the technique depends on the comparison of the sharpness metric, the brightness metric, and/or the contrast metric to the enhancement threshold pattern in that a technique is selected to be applied if the metric of the vascular image is above or below the threshold. In some embodiments, more than one threshold and/or one or more ranges for a metric of the enhancement threshold pattern determine which correction technique is used.

Therefore, the methods of the invention not only enable classification of vascular images and obtainment of vascular images but also enable enhancement of vascular images having low quality to vascular images having high quality e.g. for uses such as grading, diagnosing of diseases and/or further processing.

In some embodiments, the methods described herein classify the quality of a vascular image in real-time. In some embodiments, the methods described herein give the photographer recommendations for correcting technical errors in the acquisition of the photograph based on the classification and/or the correction of the image.

Accordingly, the invention is at least in part based on the discovery, that the correction as described herein can enhance vascular images of low quality according to the classification method of the invention.

In certain embodiments, the invention relates to a computer-implemented method for classification of quality enhanceability of a vascular image, the method comprising the steps of: i. retrieving a vascular image that is corrected according to the method of the invention; ii. determining a corrected image quality pattern of the corrected vascular image based on a sharpness metric, a brightness metric, and a contrast metric of the corrected vascular image; wherein the sharpness metric comprises determining a spatial orientation and frequency variation of at least two areas in the vascular image, the brightness metric comprises comparing the brightness values of the corrected vascular image to a brightness reference image; and the contrast metric comprises determining global contrast and determining the contrast of at least one vessel segment; iii. comparing the difference between the corrected image quality pattern and the image quality pattern to an enhanceability threshold pattern; and iv. classifying quality enhanceability of a vascular image, wherein the vascular image is classified based on the comparison of (iii), in particular wherein the vascular image is classified as enhanceable if the difference in step iii) is above the enhanceability threshold pattern and wherein the vascular image is classified as not enhanceable if the difference in step iii) is below the enhanceability threshold pattern.

The term "enhanceability threshold pattern", as used herein, refers to a pattern that allows distinguishing between 1.) enhanced images, and 2.) not enhanced or not substantially enhanced images. In some embodiments, the enhanceability threshold pattern can be chosen according to dataset size, available time and/or computer resources. In some embodiments, the enhanceability threshold pattern represents a threshold of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, or about 25% of a threshold of the image quality pattern. In some embodiments, a machine learning technique is used to generate the enhanceability threshold pattern described herein. In some embodiments, a supervised machine learning technique is used to generate the enhanceability threshold pattern described herein.

The comparison of the difference between the corrected image quality pattern and the image quality pattern indicates the enhancement achieved by the correction. Therefore, an image is classified as not enhanceable, if no enhancement or unsubstantial enhancement is achieved.

Accordingly, the invention is at least in part based on the discovery, that the enhanceability of vascular images of low quality according to the classification method of the invention can be determined.

In certain embodiments, the invention relates to a computer-implemented method for classification of the quality of a vascular image, the method comprising the steps of: I. classifying the quality of a vascular image according to the method of the invention; II. correcting the quality of the vascular image according to the method of the invention; III. classifying the quality of the corrected vascular image according to the method of the invention; and IV. classifying the vascular image as having good quality if the vascular image and/or the corrected vascular image are/is classified as having high quality.

In certain embodiments, the invention relates to a computer-implemented method for classification of the quality of a vascular image, the method comprising the steps of: I. classifying the quality of a vascular image according to the method of the invention; II. correcting the quality of the vascular image according to the method of the invention, if the vascular image is classified as having low quality according to step I.; III. classifying the quality of the corrected vascular image according to the method of the invention, if the vascular image is classified as having low quality according to step I.; and IV. classifying the vascular image as having good quality if the vascular image and/or the corrected vascular image are/is classified as having high quality.

In some embodiments, the methods described herein enable the identification and classification of images as having high quality (i.e. corrected images with good or adequate quality) that are considered to have low quality according to other methods.

Therefore, the means and methods described herein enable the classification of vascular images that not only considers their original quality but also identifies pictures that can be enhanced.

Accordingly, the invention is at least in part based on the surprising finding that the methods for classification according to the invention enable an improved classification that identifies more images of sufficient quality in a standardized manner.

In certain embodiments, the invention relates to the computer-implemented method of the invention, the method comprising the steps of: 1) classifying quality enhanceability of the corrected vascular image according to the method of the invention, if the vascular image classified as having low quality according to step I.; and 2) classifying the vascular image as having enhanceable quality if the vascular image and the corrected vascular image are determined as having low quality and the corrected vascular image is classified as enhanceable in step 1).

In certain embodiments, the invention relates to a computer-implemented method for classification of the quality of a vascular image, the method comprising the steps of: I. classifying the quality of a vascular image according to the method of the invention; II. correcting the quality of the vascular image according to the method of the invention; IV. classifying the quality of the corrected vascular image according to the method of the invention; V. classifying quality enhanceability of the corrected vascular image according to the method of the invention; and VI. a) classifying the vascular image as having good quality if the vascular image and/or the corrected vascular image are/is classified as having high quality; and b) classifying the vascular image as having enhanceable quality if the vascular image and the corrected vascular image are determined as having low quality and the corrected vascular image is classified as enhanceable in step V).

Therefore, the means and methods described herein enable the classification of vascular images that not only considers their original quality but also identifies pictures that can be enhanced.

Accordingly, the invention is at least in part based on the surprising finding that the methods for classification according to the invention enable an improved classification that identifies quality and enhanceability of vascular images in a standardized manner.

In certain embodiments, the invention relates to a computer-implemented method for classification of the quality of a vascular image, the method comprising the steps of: I. classifying the quality of a vascular image according to the method of the invention; II. correcting the quality of the vascular image according to the method of the invention; III. classifying the quality of the corrected vascular image according to the method of the invention; IV. classifying quality enhanceability of the corrected vascular image according to the method of the invention; and V. correcting the quality of the corrected vascular image according to the method of the invention and repeating the steps II) to IV) based on the classification in step IV); and VI. classifying the vascular image as having good quality if the vascular image and/or the corrected vascular image are/is classified as having high quality.

In certain embodiments, the invention relates to a computer-implemented method for classification of the quality of a vascular image, the method comprising the steps of: I. classifying the quality of a vascular image according to the method of the invention; II. correcting the quality of the vascular image according to the method of the invention; III. classifying the quality of the corrected vascular image according to the method of the invention; IV. classifying quality enhanceability of the corrected vascular image according to the method of the invention; and V. correcting the quality of the corrected vascular image according to the method of the invention and repeating the steps II) to IV) if the corrected vascular image is classified as enhanceable in step IV); and VI. classifying the vascular image as having good quality if the vascular image and/or the corrected vascular image are/is classified as having high quality.

In certain embodiments, the invention relates to the computer-implemented method of the invention, the method further comprising the steps of: I. classifying quality enhanceability of the corrected vascular image according to the method of the invention; and II. correcting the quality of the corrected vascular image according to the method of the invention if the corrected vascular image is classified as enhanceable in step IV) and repeating the correction of the corrected vascular image quality image according to the method of the invention, the classification of the quality of the corrected vascular image according to the method of the invention and the classification of the quality enhanceability of the corrected vascular image according to the method of the invention until the corrected vascular image is not classified as enhanceable according to the method of the invention.

To save computer resources and/or time, not every vascular image processed by the invention needs to run through all the steps described herein. A vascular image can be excluded from further processing for example if the vascular image is considered as being of sufficient image quality and does not require further processing. In some embodiments, the vascular image can be excluded from certain steps of the method, if the image quality pattern of the (corrected) vascular image is too far below the predefined image quality threshold pattern.

The corrected vascular image may have different or new quality issues compared to the original vascular image or the amount of correction may be low after one cycle. Therefore, the method of the invention evaluates the enhanceability of the corrected vascular image and repeats the correction after a successful correction cycle. Therefore, the (corrected) vascular image can be repeatedly corrected until no further improvement or no substantial further improvement is achieved. By this repeated correction the vascular image can be optimally enhanced before eventual image quality assessment.

Therefore, the means and methods described herein enable the classification of vascular images that not only considers their original quality but also identifies pictures that can be enhanced by repeated enhancement steps (see, e.g. FIG. 2).

Accordingly, the invention is at least in part based on the surprising finding that the methods for classification according to the invention enables an improved classification that identifies more images of high quality in a standardized manner.

In certain embodiments, the invention relates to a computer-implemented method for obtainment of a quality enhanced vascular image, the method comprising the steps of: i. correcting the quality of a vascular image according to the method of the invention; ii. classifying quality in the corrected vascular image according to the method of the invention; iii. obtaining the quality enhanced vascular image by storing the corrected vascular image, based on the classification in step ii).

In certain embodiments, the invention relates to a computer-implemented method for obtainment of a quality enhanced vascular image, the method comprising the steps of: i. correcting the quality of a vascular image according to the method of the invention; ii. classifying quality in the corrected vascular image according to the method of the invention; iii. obtaining the quality enhanced vascular image by storing the corrected vascular image if the image is classified as having high quality in step ii).

Therefore, the means and methods described herein enable the obtainment of quality enhanced vascular images from vascular images having low quality according to the invention.

Accordingly, the invention is at least in part based on the surprising finding that it enables standardized obtainment of enhanced vascular images.

In certain embodiments, the invention relates to a computer-implemented method for obtainment of a quality enhanced vascular image, the method comprising the steps of: i. correcting the quality of a vascular image according to the method of the invention; ii. classifying quality in the corrected vascular image according to the method of the invention; iii. classifying quality enhanceability of the corrected vascular image according to the method of the invention based on the classification in step ii); iv. correcting the quality of the corrected vascular image according to the method of the invention and repeating the steps 2) to 4) based on the enhanceability classification; and v. obtaining the quality enhanced vascular image by storing the corrected vascular image if the image is classified as having high quality in step ii).

In certain embodiments, the invention relates to a computer-implemented method for obtainment of a quality enhanced vascular image, the method comprising the steps of: i. correcting the quality of a vascular image according to the method of the invention; ii. classifying quality in the corrected vascular image according to the method of the invention; iii. classifying quality enhanceability of the corrected vascular image according to the method of the invention if the corrected vascular image is classified as having low quality in step ii); iv. correcting the quality of the corrected vascular image according to the method of the invention and repeating the steps 2) to 4) if the corrected vascular image is classified as enhanceable; and v. obtaining the quality enhanced vascular image by storing the corrected vascular image if the image is classified as having high quality in step ii).

In certain embodiments, the invention relates to the computer-implemented method of the invention, the method further comprising the steps of: 1. classifying quality enhanceability of the corrected vascular image according to the method of the invention if the corrected vascular image is classified as having low quality in step ii); 2. correcting the quality of the corrected vascular image according to the method of the invention and repeating the correction if the corrected vascular image remains being classified as enhanceable.

Therefore, the means and methods described herein enable the obtainment of vascular images enhanced by repeated correction cycles.

Accordingly, the invention is at least in part based on the surprising finding that it enables standardized obtainment of repeatedly enhanced vascular images.

In some embodiments, the invention relates to a combination of the method for classification described herein and the method for obtaining an enhanced image described herein.

In certain embodiments, the invention relates to the computer-implemented method for classification according to the invention, wherein the brightness metric determination comprises segmentation and comparison thereof to a segment reference pattern.

In certain embodiments, the invention relates to the computer-implemented method for correction according to the invention, wherein the brightness metric determination comprises segmentation and comparison thereof to a segment reference pattern.

In certain embodiments, the invention relates to the computer-implemented method for obtainment according to the invention, wherein the brightness metric determination comprises segmentation and comparison thereof to a segment reference pattern.

The segmentation procedure may determine regions of varying intensity within the brightness image. The segmentation according to the brightness-related content can result in nested regions. A high number or dense nested regions is an indicator of highly variable regions close to one another, where as only a few large regions could mean little to no brightness variation. The metrics mentioned here are obtained off of the segmentation according to brightness and may consider size, compactness, and/or count to determine correlated feature that indicated varying or uniform brightness.

In certain embodiments, the invention relates to the computer-implemented method for classification according to the invention, wherein the brightness metric determination comprises the steps of: a) segmentation of the vascular image; b) comparison of a segment to a segment reference pattern; and c) determining based whether the brightness of the segment is indicative of anatomical brightness or quality-related brightness alterations.

In certain embodiments, the invention relates to the computer-implemented method for correction according to the invention, wherein the brightness metric determination comprises the steps of: a) segmentation of the vascular image; b) comparison of a segment to a segment reference pattern; and c) determining based whether the brightness of the segment is indicative of anatomical brightness or quality-related brightness alterations.

In certain embodiments, the invention relates to the computer-implemented method for obtainment according to the invention, wherein the brightness metric determination comprises the steps of: a) segmentation of the vascular image; b) comparison of a segment to a segment reference pattern; and c) determining based whether the brightness of the segment is indicative of anatomical brightness or quality-related brightness alterations.

In certain embodiments, the invention relates to the computer-implemented method for classification according to the invention, wherein the segment is a segment with having an abnormal brightness level, wherein a abnormal brightness level is a brightness level below a minimal brightness threshold value or a brightness level above a maximal brightness threshold value.

In certain embodiments, the invention relates to the computer-implemented method for correction according to the invention, wherein the segment is a segment with having an abnormal brightness level, wherein an abnormal brightness level is a brightness level below a minimal brightness threshold value or a brightness level above a maximal brightness threshold value.

In certain embodiments, the invention relates to the computer-implemented method for obtainment according to the invention, wherein the segment is a segment with having an abnormal brightness level, wherein an abnormal brightness level is a brightness level below a minimal brightness threshold value or a brightness level above a maximal brightness threshold value.

The term "segmentation", as used herein, refers to dividing an image into different regions, and/or dividing an image into different regions an area in space depicted in one or more images (e.g., an image plane). In some embodiments, the segmentation technique is an instance segmentation technique. In some embodiments, the segmentation technique is a semantic segmentation technique. In some embodiments, the segmentation technique described herein is a technique selected from the group of thresholding, clustering methods, compression-based methods, histogram-based methods, edge detection, dual clustering method, region-growing methods, partial differential equation-based methods, variational methods, graph partitioning methods, Markov random fields, supervised image segmentation, gradient descent, simulated annealing, watershed transformation, model-based segmentation, multi-scale segmentation, one-dimensional hierarchical signal segmentation, semi-automatic segmentation, and trainable segmentation.

The term "segment reference pattern", as used herein, refers to a pattern that allows distinguishing between biological and technical artefacts. Biological artefacts refer to anomalies on the image that represent for example a pathologic and/or physiologic characteristic. Technical artefacts refer to anomalies on the image that represent for example poor image quality, e.g., artefacts created by the capturing process. In some embodiments the segment reference pattern allows distinguishing the artefacts based on location, form factor, sharpness, brightness and/or contrast. In some embodiments, the segment reference pattern is obtainable by a machine-learning technique.

Vascular images often comprise imaging artefacts such as bright flashes with various shapes and sizes, including but not limited to, streaks, patches, discs, and rings. These technical artefacts can have substantially different brightness values and may therefore distort the image quality score of an otherwise high quality image (e.g. a gradable image) (See, e.g., FIG. 16).

Therefore, the methods described herein can in some embodiments distinguish, whether abnormal brightness variation is caused by the anatomy/physiology or by a technical artefact.

In some embodiments, an area of an artefact that is associated with a pathology are differently weighted (e.g., excluded) for further determination of image quality, without altering the image content of the artefact that is associated with a pathology.

Accordingly, the invention is at least in part based on the surprising finding that brightness in the context of the invention can be determined particularly accurately by distinguishing between biological segments and technical artefact segments.

In certain embodiments, the invention relates to the computer-implemented method for classification according to the invention, wherein brightness metric comprises segmentation using region growing segmentation.

In certain embodiments, the invention relates to the computer-implemented method for correction according to the invention, wherein brightness metric comprises segmentation using region growing segmentation.

In certain embodiments, the invention relates to the computer-implemented method for obtainment according to the invention, wherein brightness metric comprises segmentation using region growing segmentation.

The term "region growing segmentation", as used herein, refers to a segmentation method, wherein a pixel is compared with its neighbors and if a similarity criterion is satisfied, the pixel is set to belong to the same cluster as one or more of its neighbors. The region growing segmentation procedure has proven to be efficient in appropriate segmentation of technical artefacts of various sizes and with unpredictable locations Accordingly, the invention is at least in part based on the surprising finding that brightness in the context of the invention can be determined particularly accurately by using segmentation.

In certain embodiments, the invention relates to the computer-implemented method for classification according to the invention, wherein brightness metric comprises segmentation using a fuzzy membership function.

In certain embodiments, the invention relates to the computer-implemented method for correction according to the invention, wherein brightness metric comprises segmentation using a fuzzy membership function.

In certain embodiments, the invention relates to the computer-implemented method for obtainment according to the invention, wherein brightness metric comprises segmentation using a fuzzy membership function.

In certain embodiments, the invention relates to the computer-implemented method for classification according to the invention, wherein brightness metric comprises segmentation using a fuzzy membership function and region growing segmentation.

In certain embodiments, the invention relates to the computer-implemented method for correction according to the invention, wherein brightness metric comprises segmentation using a fuzzy membership function and region growing segmentation.

In certain embodiments, the invention relates to the computer-implemented method for obtainment according to the invention, wherein brightness metric comprises segmentation using a fuzzy membership function and region growing segmentation.

In certain embodiments, the invention relates to the computer-implemented method for classification according to the invention, wherein the brightness metric comprises the segmentation of the vascular image comprises using a fuzzy membership function and/or region growing segmentation.

In certain embodiments, the invention relates to the computer-implemented method for correction according to the invention, wherein the brightness metric comprises the segmentation of the vascular image comprises using a fuzzy membership function and/or region growing segmentation.

In certain embodiments, the invention relates to the computer-implemented method for obtainment according to the invention, wherein the brightness metric comprises the segmentation of the vascular image comprises using a fuzzy membership function and/or region growing segmentation.

The term "fuzzy membership function", as used herein, refers to a function to classify data according to a degree of membership in a fuzzy set that varies continuously from zero (not a member) to one (absolutely a member).

In some embodiments, the invention relates to the computer-implemented method for classification according to the invention or the computer-implemented method for obtainment according to the invention, wherein the field of view mask area is segmented using the 1.1.1.2. Brightness Segmentation Module-Region Growing (see, e.g., FIG. 9).

Technical artefacts have unpredictable brightness gradients in particular in their boundaries. The fuzzy membership function has proven surprisingly efficient in the adequate segmentation and boundaries definition of technical artefacts of various boundary brightness gradients.

Accordingly, the invention is at least in part based on the surprising finding that brightness in the context of the invention can be determined particularly accurately by using a fuzzy membership function and/or region growing segmentation for segmentation according to brightness.

In certain embodiments, the invention relates to the computer-implemented method for classification according to the invention, wherein the brightness metric comprises homomorphic filtering.

In certain embodiments, the invention relates to the computer-implemented method for correction according to the invention, wherein the brightness metric comprises homomorphic filtering.

In certain embodiments, the invention relates to the computer-implemented method for obtainment according to the invention, wherein the brightness metric comprises homomorphic filtering.

In certain embodiments, the invention relates to the computer-implemented method for classification according to the invention, wherein the brightness metric comprises comparing at least part of the brightness metrics of the vascular image to a brightness reference image, preferably comparing the radial spectral power density to a reference image.

In certain embodiments, the invention relates to the computer-implemented method for correction according to the invention, wherein the brightness metric comprises comparing at least part of the brightness metrics of the vascular image to a brightness reference image, preferably comparing the radial spectral power density to a reference image.

In certain embodiments, the invention relates to the computer-implemented method for obtainment according to the invention, wherein the brightness metric comprises comparing at least part of the brightness metrics of the vascular image to a brightness reference image, preferably comparing the radial spectral power density to a reference image.

In certain embodiments, the invention relates to the computer-implemented method for classification according to the invention, wherein the brightness metric comprises determining a Fourier transformation of the of the vascular image, wherein a frequencies above a Fourier transformation frequency threshold contribute more to the brightness metric than the frequencies below the Fourier transformation frequency threshold, preferably wherein frequencies below the Fourier transformation frequency threshold are excluded from the brightness metric computation.

In certain embodiments, the invention relates to the computer-implemented method for correction according to the invention, wherein the brightness metric comprises determining a Fourier transformation of the of the vascular image, wherein a frequencies above a Fourier transformation frequency threshold contribute more to the brightness metric than the frequencies below the Fourier transformation frequency threshold, preferably wherein frequencies below the Fourier transformation frequency threshold are excluded from the brightness metric computation.

In certain embodiments, the invention relates to the computer-implemented method for obtainment according to the invention, wherein the brightness metric comprises determining a Fourier transformation of the of the vascular image, wherein a frequencies above a Fourier transformation frequency threshold contribute more to the brightness metric than the frequencies below the Fourier transformation frequency threshold, preferably wherein frequencies below the Fourier transformation frequency threshold are excluded from the brightness metric computation.

In certain embodiments, the invention relates to the computer-implemented method for classification according to the invention, wherein the brightness metric comprises determining a Fourier transformation and low-pass filtering.

In certain embodiments, the invention relates to the computer-implemented method for correction according to the invention, wherein the brightness metric comprises determining a Fourier transformation and low-pass filtering.

In certain embodiments, the invention relates to the computer-implemented method for obtainment according to the invention, wherein the brightness metric comprises determining a Fourier transformation and low-pass filtering.

In some embodiments, the vascular image is transformed to the spectral domain (e.g. via Fourier transform) and then a filter (e.g. a Butterworth filter), is applied to the spectral representation of the image. In some embodiments, the filtered spectral representation of the image is used for the extraction of further features. In some embodiments, the filtered spectral representation is then transformed back to the spatial domain (via the appropriate inverse transform) and additional features are computed on the spatial-domain filtered image.

The term "Fourier transformation", as used herein, refers to a mathematical transformation of the image that decomposes functions depending on space or time into functions depending on spatial or temporal frequency. The Fourier transformation may include convolving the image with a frequency-based filter, wherein the operation results in multiplication in the frequency domain. In some embodiments, the Fourier transformation is selected from the group of Fast Fourier transformation, discrete Fourier transformation, discrete-time Fourier transformation, and inverse Fourier transformation.

The term "low-pass filtering", as used herein, refers to a filtering method that passes signals with a frequency or wavelength lower than a selected cutoff frequency or wavelength and attenuates signals with frequencies or wavelengths higher than the cutoff frequency or wavelength. The optimal selection of cut-off frequency may be achieved, e.g., by starting with a cut-off frequency for example in the 10th percentile of the lowest frequency range (from zero) and subsequently using a training set of images (exclusive of those we validated the results on) to determine an adequate cut-off range of the filter to fine-tune the most optimal frequency point. Alternatively the cut-off frequency can by determined by relating it to the spatial and physiological characteristics of the objects to be removed or retained.

The advantage of using Fourier transformation and/or low-pass filtering is the reduction of required computer resources and required time in the context of the invention. This increased efficiency enables the implementation to be used, e.g, in real-time, on mobile devices and/or with a lower data transfer requirement. In some embodiments, the fast Fourier transform is used in the context of inverse operation.

Accordingly, the invention is at least in part based on the surprising finding that brightness in the context of the invention can be determined particularly efficient and accurately by using Fourier transformation and/or low-pass filtering.

In certain embodiments, the invention relates to the computer-implemented method for classification according to the invention, wherein the brightness metric comprises determining at least one brightness metric selected from the group of angular spectral power density, image moment, histogram metric and radial spectral power density.

In certain embodiments, the invention relates to the computer-implemented method for correction according to the invention, wherein the brightness metric comprises determining at least one brightness metric selected from the group of angular spectral power density, image moment, histogram metric and radial spectral power density.

In certain embodiments, the invention relates to the computer-implemented method for obtainment according to the invention, wherein the brightness metric comprises determining at least one brightness metric selected from the group of angular spectral power density, image moment, histogram metric and radial spectral power density.

The term "spectral power density", as used herein, refers to the spread of the energy of a signal/image over a band of frequency. Therefore, the power spectral density can represent a measure of the power across a frequency band in the frequency domain of the image/signal.

The term "angular spectral power density", as used herein, refers to the angularly (over a certain range of orientation, for 0 to 180 degrees) average value of the spectral power density. Therefore, the angular spectral power can represent the density distribution of the power spectral density as a function of angle or orientation, over the range 0 to 180 degrees, in the image.

The angular spectral power density of brightness as described herein can be used to determine angular spectral power density metrics such as standard deviation, entropy, and coefficient of variation. In some embodiments, one or more angular spectral power density metrics are compared to the brightness reference image.

The term "image moment", as used herein, refers to a particularly weighted average of the image pixels' intensities. In some embodiments, the image moment described herein is at least one image moment selected from the group of Cartesian image moment, Legendre image moment, and Zernike image moment.

The term "histogram metric", as used herein, refers to a metric the histogram representation of an image metric. The Histogram metrics of brightness as described herein include, without limitation, mean brightness, standard deviation, skewness, kurtosis, and/or the coefficient of variation.

The term "radial spectral power density", as used herein, refers to radially averaged spectral power density.

The radial spectral power density of brightness as described herein can be used to determine angular spectral power density metrics such as standard deviation, kurtosis, and entropy. In some embodiments, one or more radial spectral power density metrics are compared to the brightness reference image.

In some embodiments, the invention relates to the computer-implemented method for classification according to any one of the invention or the computer-implemented method for obtainment according to the invention, wherein brightness is determined by two, three or four brightness metrics selected from the group of angular spectral power density, image moment, histogram metric and radial spectral power density.

The brightness metrics described herein deliver a comprehensive characterization of the brightness-related image quality characteristics of a vascular image (see, e.g., 1.1.1. Brightness Assessment FIG. 5).

Accordingly, the invention is at least in part based on the surprising finding that brightness in the context of the invention can be determined particularly accurately by using angular spectral power density, image moment, histogram metric, and/or radial spectral power density.

In certain embodiments, the invention relates to the computer-implemented method for classification according to the invention, wherein determining the contrast metric comprises comparison of the intensity distributions of a foreground and a background region.

In certain embodiments, the invention relates to the computer-implemented method for correction according to the invention, wherein determining the contrast metric comprises comparison of the intensity distributions of a foreground and a background region.

In certain embodiments, the invention relates to the computer-implemented method for obtainment according to the invention, wherein determining the contrast metric comprises comparison of the intensity distributions of a foreground and a background region.

In certain embodiments, the invention relates to the computer-implemented method for classification according to the invention, wherein the foreground region of the vessel contrast are the vessels and the background regions of the vessel contrast are regions adjacent to the vessels, wherein each foreground region has a corresponding background region with at least 50%, at least 60%, at least 70%, at least 80%, at least 90%, at least 95% or 100% of the area of the foreground region, preferably wherein each background region covers all borders of the foreground region.

In certain embodiments, the invention relates to the computer-implemented method for correction according to the invention or the computer-implemented method for obtainment according to the invention, wherein the foreground region of the vessel contrast are the vessels and the background regions of the vessel contrast are regions adjacent to the vessels, wherein each foreground region has a corresponding background region with at least 50%, at least 60%, at least 70%, at least 80%, at least 90% or at least 95% of the area of the foreground region, preferably wherein each background region covers all borders of the foreground region.

In certain embodiments, the invention relates to the computer-implemented method for obtainment according to the invention, wherein the foreground region of the vessel contrast are the vessels and the background regions of the vessel contrast are regions adjacent to the vessels, wherein each foreground region has a corresponding background region with at least 50%, at least 60%, at least 70%, at least 80%, at least 90% or at least 95% of the area of the foreground region, preferably wherein each background region covers all borders of the foreground region.

In certain embodiments, the vessel contrast described herein is indicative of the vessel contrast of more than 50%, more than 60%, more than 70%, more than 80%, more than 90% or all identifiable vessels.

The background regions adjacent to the foreground region can be generated individually for each image. This enables efficient, precise and orientation-independent contrast and/or quality determination. Furthermore, the method does not require physiological structures to be present, for example the quality of vascular images with an ONH can be compared to the quality of vascular images that do not include an ONH.

Accordingly, the invention is at least part based on a way to determine the quality of pictures that were not determinable by the methods known in the art, e.g. methods that use the ONH for orientation.

In certain embodiments, the invention relates to the computer-implemented method for classification according to the invention, the computer-implemented method for correction according to the invention, or the computer-implemented method for obtainment according to the invention, wherein the contrast metric comprises determining the statistical distribution of contrast values.

In certain embodiments, the statistical distribution of contrast values described herein comprises the mean and covariance of the statistical distribution of contrast values.

In certain embodiments, the invention relates to the computer-implemented method for classification according to the invention, wherein determining the contrast metric comprises determining a Jeffries Matusita Distance and/or Jensen-Shannon Divergence between the foreground and the background region.

In certain embodiments, the invention relates to the computer-implemented method for correction according to the invention or the computer-implemented method for obtainment according to the invention, wherein determining the contrast metric comprises determining a Jeffries Matusita Distance and/or Jensen-Shannon Divergence between the foreground and the background region.

In certain embodiments, the invention relates to the computer-implemented method for obtainment according to the invention, wherein determining the contrast metric comprises determining a Jeffries Matusita Distance and/or Jensen-Shannon Divergence between the foreground and the background region.

In certain embodiments, the invention relates to the computer-implemented method for classification according to the invention, wherein the contrast metric comprises determining a Jeffries Matusita Distance and/or Jensen-Shannon Divergence.

In certain embodiments, the invention relates to the computer-implemented method for correction according to the invention, wherein the contrast metric comprises determining a Jeffries Matusita Distance and/or Jensen-Shannon Divergence.

In certain embodiments, the invention relates to the computer-implemented method for obtainment according to the invention, wherein the contrast metric comprises determining a Jeffries Matusita Distance and/or Jensen-Shannon Divergence.

Jeffries Matusita Distance accounts for the means as well as the covariances of the statistical distributions of the values being compared. It treats each distribution as a whole, rather than comparing bin by bin as done in similar methods. In some embodiments, the Jeffries Matusita Distance described herein is bounded, for example, bounded in the range of [0,sqrt2].

Jensen-Shannon Divergence provides a symmetric measure of non-mutual information compared to similar methods. In some embodiments, the Jensen-Shannon Divergence described herein is bounded, for example, bounded in the range of [0,1].

Jeffries Matusita Distance and Jensen-Shannon Divergence do not require a reference distribution. These measures are designed to measure the "distance" between two distributions. Thus they take into account shape differences, as well as differences in location (i.e. mean). Other methods such as the point-to-point Euclidean distance do not consider the mean and covariance of the distributions explicitly. Therefore, the Jeffries Matusita Distance and Jensen-Shannon Divergence contribute to the accuracy of the method of the invention.

Accordingly, the invention is at least in part based on the surprising finding that determining distance and divergence, in particular, Jeffries Matusita Distance and/or Jensen-Shannon Divergence of segments determined based on contrast improves the accuracy of the methods of the invention.

In certain embodiments, the invention relates to the computer-implemented method for classification according to the invention, wherein global contrast is determined using at least 50%, at least 60%, at least 70%, at least 80%, at least 90% or at least 95% of the pixels of the image.

In certain embodiments, the invention relates to the computer-implemented method for correction according to the invention, wherein global contrast is determined using at least 50%, at least 60%, at least 70%, at least 80%, at least 90% or at least 95% of the pixels of the image.

In certain embodiments, the invention relates to the computer-implemented method for obtainment according to the invention, wherein global contrast is determined using at least 50%, at least 60%, at least 70%, at least 80%, at least 90% or at least 95% of the pixels of the image.

In certain embodiments, the invention relates to the computer-implemented method for classification according to the invention, the computer-implemented method for correction according to the invention, or the computer-implemented method for obtainment according to the invention, wherein the contrast metric comprises determining segments indicative for additional biologic structures.

The term "biologic structure", as used herein refers to at least one-pixel cluster on the vascular image that represents a biologic entity. In some embodiments, the biologic structure represents at least one biologic entity selected from the group of vessels, tissue parts, lesions, cells, cell clusters, cell types, pathologic structures (e.g. lesions), body-liquids, and biological messengers (e.g., cellular messengers, neuronal messengers). In some embodiments, the biologic entity is labeled (e.g. by a radioactive label or a fluorescent label) and/or highlighted (e.g., by a contrast agent). In some embodiments, the biologic structures on the vascular image are identified by comparing the vascular image to a biologic structure reference pattern. In some embodiments, the biologic structure reference pattern described herein is obtainable by a machine-learning technique. In some embodiments, the biologic structures on the vascular image are identified by Fourier transformation and a filtering technique.

The biologic structures on the vascular image comprise significant biological and diagnostic information. Therefore, the properties and/or the image quality of the biologic structure are/is particularly relevant for subsequent grading and/or diagnosing. The presence of (an) abnormal biologic structure(s) may facilitate gradability. Therefore, an image demonstrating (an) abnormal biologic structure(s) may be considered to have an increased corrected image quality score. In some embodiments, at least one property of the biologic structure(s) influence(s) the corrected image quality score. In some embodiments, the property of the biologic structure segment(s) is at least one property selected from the group of location, distribution, form (e.g., circularity or aspect ratio), and size.

In some embodiments, the invention relates to the computer-implemented method for classification according to the invention or the computer-implemented method for obtainment according to the invention, wherein the distance and/or divergence of biologic structure segments is determined.

The distribution and or separability of segments on the vascular image determined based on the contrast comprises information about the image quality of the vascular image. For example, a blurry image usually results in missing contrast segments, and therefore unusual distance and/or divergence between the segments determined based on contrast (See e.g., 1.1.2. Contrast Assessment FIG. 6).

In certain embodiments, the invention relates to the computer-implemented method for classification according to the invention, wherein the contrast metric comprises lesion segments.

In certain embodiments, the invention relates to the computer-implemented method for correction according to the invention, wherein the contrast metric comprises lesion segments.

In certain embodiments, the invention relates to the computer-implemented method for obtainment according to the invention, wherein the contrast metric comprises lesion segments.

The term "lesion segment", as used herein, refers to segmentation that results in at least one lesion area.

In some embodiments, the lesion area is identified by comparing the vascular image to a lesion reference pattern. In some embodiments, the lesion reference pattern described herein is obtainable by a machine-learning technique. In some embodiments, a supervised machine learning technique is used to generate the lesion reference pattern described herein. In some embodiments, the supervised machine learning technique described herein is a trained convolutional neural network, such as a deep convolutional neural network. In some embodiments, the supervised machine learning technique described herein is trained and/or validated using labeled data (see e.g., Example 5).

The lesions on the vascular image comprise significant biological and diagnostic information. Therefore, the properties and/or the image quality of the lesions segment is particularly relevant for subsequent grading and/or diagnosing. The presence of (an) abnormal lesion(s) may facilitate gradability. Therefore, an image demonstrating (an) abnormal lesion(s) may be considered to have an increased corrected image quality score. In some embodiments, at least one property of the lesion segment(s) influence(s) the corrected image quality score. In some embodiments, the property of the lesion segment(s) is at least one property selected from the group of location, distribution, form (e.g., circularity or aspect ratio), and size.

Accordingly, the invention is at least in part based on the surprising finding that contrast relevant for image quality in the context of the invention can be determined particularly accurately by using lesion segmentation.

In certain embodiments, the invention relates to the computer-implemented method for classification according to the invention, wherein the contrast metric comprises determining superpixel segments.

In certain embodiments, the invention relates to the computer-implemented method for correction according to the invention, wherein the contrast metric comprises determining superpixel segments.

In certain embodiments, the invention relates to the computer-implemented method for obtainment according to the invention, wherein the contrast metric comprises determining superpixel segments.

In certain embodiments, the invention relates to the computer-implemented method for classification according to the invention, wherein the contrast metric comprises determining superpixel segments and lesion segments.

In certain embodiments, the invention relates to the computer-implemented method for correction according to the invention, wherein the contrast metric comprises determining superpixel segments and lesion segments.

In certain embodiments, the invention relates to the computer-implemented method for obtainment according to the invention, wherein the contrast metric comprises determining superpixel segments and lesion segments.

The term "superpixel segment", as used herein, refers to a segment of a tangential group of pixels that are similar or equal in a certain metric. In embodiments, wherein the superpixel segments are determined based on the contrast of the vascular image, the superpixel segment is a segment of a tangential group of pixels that are similar or equal in a contrast metric.

In certain embodiments, the invention relates to the computer-implemented method for classification according to the invention, wherein the superpixel segments are non-overlapping clusters of pixels clustered based on color similarity and distance from a seed pixel.

In certain embodiments, the invention relates to the computer-implemented method for correction according to the invention, wherein the superpixel segments are non-overlapping clusters of pixels clustered based on color similarity and distance from a seed pixel.

In certain embodiments, the invention relates to the computer-implemented method for obtainment according to the invention, wherein the superpixel segments are non-overlapping clusters of pixels clustered based on color similarity and distance from a seed pixel.

In certain embodiments, the invention relates to the computer-implemented method for classification according to the invention, wherein the superpixel segments are non-overlapping clusters of pixels clustered based on a) color similarity or intensity similarity; and b) distance from a seed pixel.

In certain embodiments, the invention relates to the computer-implemented method for correction according to the invention, wherein the superpixel segments are non-overlapping clusters of pixels clustered based on a) color similarity or intensity similarity; and b) distance from a seed pixel.

In certain embodiments, the invention relates to the computer-implemented method for obtainment according to the invention, wherein the superpixel segments are non-overlapping clusters of pixels clustered based on a) color similarity or intensity similarity; and b) distance from a seed pixel.

For example, if the vascular image is a colored image, the clustering may be based on color similarity and if the vascular image is a grayscale image or converted thereto, the clustering may be based on intensity similarity.

In some embodiments, the superpixel segments described herein are obtained by the 1.1.2.1. Superpixel Module (see, e.g., FIG. 10).

The use of a clustering-based segmentation method such as a superpixel segmentation as described herein contributes to the accuracy of the method and enables standardized global contrast-based segmentation without the requirement of a reference pattern.

Accordingly, the invention is at least in part based on the surprising finding that contrast in the context of the invention can be determined particularly accurately by using superpixel segmentation.

In certain embodiments, the invention relates to the computer-implemented method for classification according to the invention, wherein the foreground regions are superpixel segments and the background regions are regions adjacent to the foreground region, wherein each foreground region has a corresponding background region with at least 50%, at least 60%, at least 70%, at least 80%, at least 90% or at least 95% of the area of the foreground region, preferably wherein each background region covers all borders of the foreground region.

In certain embodiments, the invention relates to the computer-implemented method for correction according to the invention, wherein the foreground regions are superpixel segments and the background regions are regions adjacent to the foreground region, wherein each foreground region has a corresponding background region with at least 50%, at least 60%, at least 70%, at least 80%, at least 90% or at least 95% of the area of the foreground region, preferably wherein each background region covers all borders of the foreground region.

In certain embodiments, the invention relates to the computer-implemented method for obtainment according to the invention, wherein the foreground regions are superpixel segments and the background regions are regions adjacent to the foreground region, wherein each foreground region has a corresponding background region with at least 50%, at least 60%, at least 70%, at least 80%, at least 90% or at least 95% of the area of the foreground region, preferably wherein each background region covers all borders of the foreground region.

In certain embodiments, the invention relates to the computer-implemented method for obtainment according to the invention, wherein the at least one vessel segment is determined using a response to an orientation-sensitive filter.

In certain embodiments, the invention relates to the computer-implemented method for correction according to the invention, wherein the at least one vessel segment is determined using a response to an orientation-sensitive filter.

In certain embodiments, the invention relates to the computer-implemented method for obtainment according to the invention, wherein the at least one vessel segment is determined using a response to an orientation-sensitive filter.

In certain embodiments, the invention relates to the computer-implemented method for classification according to the invention, wherein the at least one vessel segment is determined using Gabor response.

In certain embodiments, the invention relates to the computer-implemented method for correction according to the invention, wherein the at least one vessel segment is determined using Gabor response.

In certain embodiments, the invention relates to the computer-implemented method for obtainment according to the invention, wherein the at least one vessel segment is determined using Gabor response.

The term "Gabor response", as used herein, refers to the response to a Gabor filter. In some embodiments, the Gabor filter described herein is a traditional Gabor filter. In some embodiments, the Gabor filter described herein is a modified Gabor filter. In some embodiments thickness (t) and elongation (I) is used instead of the standard parameters (sigma_x, sigma_y, and f_o) of the Gabor filter. The advantage of the approach is that it allows direct selection of the parameters based on the thickness and relative linearity of the object to be detected (vessels). For example, the thickness parameter of the Gabor filter may be set to a certain start value. Subsequently, a separate training set can be used to amend this parameter and the values to determine a combination of t and l that provides the best multiscale results (Example 4).

The Gabor response comprises a high response value and the ability to filter noise. Furthermore, it also provides the dominant orientation at each pixel. The dominant orientation at each pixel allows the determination the direction of a detected feature (e.g. a vessel) centered or positioned at the pixel considered. Using this information, analysis of oriented features, such as vessels, can be separated from non-oriented features, such as background noise or round objects. Additionally, specific information about the topology of the vasculature, including their thickness and tortuosity, is determined in a precise manner via the orientation information obtained from the Gabor filters.

Accordingly, the invention is at least in part based on the surprising finding that contrast in the context of the invention can be determined particularly accurately by using Gabor response.

In certain embodiments, the invention relates to the computer-implemented method for classification according to the invention, wherein the Laplacian Energy of at least one vessel segment and/or in at least one lesion segment is determined.

In certain embodiments, the invention relates to the computer-implemented method for correction according to the invention, wherein the Laplacian Energy of at least one vessel segment and/or in at least one lesion segment is determined.

In certain embodiments, the invention relates to the computer-implemented method for obtainment according to the invention, wherein the Laplacian Energy of at least one vessel segment and/or in at least one lesion segment is determined.

The term "Laplacian Energy", as used herein, refers to is a measure of high-frequency content in the image. In some embodiments, the Laplacian Energy described herein is determined by the application of a 3×3 Laplacian mask as a gradient operator. Large values of the gradient correspond to the presence of sharp features in the image as described by R. Rangayyan 2015, "Biomedical Signal Analysis", John Wiley & Sons.

In some embodiments, the Laplacian energy described herein is a normalized Laplacian energy. The Laplacian energy can be normalized by using the comparison of the Laplacian energy of the original image and the Laplacian energy of the brightness normalized image, wherein the brightness normalization is achieved using the comparison of the image to the brightness reference image. In some embodiments, the Laplacian energy is normalized by the sum of the squared deviations from the mean of the image.

The use of the Laplacian energy as described herein provides a measure independent of the average image brightness and improves characterization of image sharpness (e.g. edge sharpness) and contrast. Therefore, the Laplacian energy contributes to the accuracy of the means and method of the invention.

Accordingly, the invention is at least in part based on the surprising finding that contrast in the context of the invention can be determined particularly accurately by using Laplacian Energy.

In certain embodiments, the invention relates to the computer-implemented method for classification according to the invention, wherein sharpness metric comprises determining a Fourier transformation of the vascular image, wherein a band of frequency of the fourier transform contributes more to the sharpness metric than the frequencies higher and lower than the band of frequency of the fourier transform, preferably wherein frequencies higher and lower than the band of frequency of the fourier transform are excluded from sharpness metric computation.

In certain embodiments, the invention relates to the computer-implemented method for correction according to the invention, wherein sharpness metric comprises determining a Fourier transformation of the vascular image, wherein a band of frequency of the fourier transform contributes more to the sharpness metric than the frequencies higher and lower than the band of frequency of the fourier transform, preferably wherein frequencies higher and lower than the band of frequency of the fourier transform are excluded from sharpness metric computation.

In certain embodiments, the invention relates to the computer-implemented method for obtainment according to the invention, wherein sharpness metric comprises determining a Fourier transformation of the vascular image, wherein a band of frequency of the fourier transform contributes more to the sharpness metric than the frequencies higher and lower than the band of frequency of the fourier transform, preferably wherein frequencies higher and lower than the band of frequency of the fourier transform are excluded from sharpness metric computation.

In certain embodiments, the invention relates to the computer-implemented method for classification according to the invention, wherein sharpness metric comprises determining a Fourier transformation and bandpass filtering.

In certain embodiments, the invention relates to the computer-implemented method for correction according to the invention, wherein sharpness metric comprises determining a Fourier transformation and bandpass filtering.

In certain embodiments, the invention relates to the computer-implemented method for obtainment according to the invention, wherein sharpness metric comprises determining a Fourier transformation and bandpass filtering.

The term "bandpass filtering", as used herein, refers to a filtering method that passes signals with a frequency or wavelength within a selected frequency bandwidth or wavelength bandwidth and attenuates signals with frequencies or wavelengths outside the selected bandwidth. In some embodiments, the bandwidth described herein is defined by an upper limit and a lower limit. In some embodiments, the bandwidth described herein is defined by a frequency with or wavelength width. Estimation of the cut-off boundaries depends on the nature of the images being processed (e.g., tissue type, capturing technique, patient group). For example, the cut-off boundaries depend on the estimated size of the blood vessels in retinal images and their correspondence with spatial frequency. The cut-off boundaries for adult retinal images can be determined by the normalized radial frequency range corresponded to the typical blood vessels. Then these boundaries are varied around an initial estimate to fine-tune the cut-off frequencies.

The advantage of using Fourier transformation and/or band-pass filtering is the reduction of required computer resources and required time in the context of the invention.

This increased efficiency enables the implementation to be used, e.g, in real-time, on mobile devices and/or with a lower data transfer requirement.

Accordingly, the invention is at least in part based on the surprising finding that sharpness in the context of the invention can be determined particularly accurately by using Fourier transformation and bandpass filtering.

In certain embodiments, the invention relates to the computer-implemented method for classification according to the invention, wherein the sharpness comprises at least one sharpness metric selected from the group of L* channel metric, angular spectral power density, and radial spectral power density.

In certain embodiments, the invention relates to the computer-implemented method for correction according to the invention, wherein the sharpness comprises at least one sharpness metric selected from the group of L* channel metric, angular spectral power density, and radial spectral power density.

In certain embodiments, the invention relates to the computer-implemented method for obtainment according to the invention, wherein the sharpness comprises at least one sharpness metric selected from the group of L* channel metric, angular spectral power density, and radial spectral power density.

In certain embodiments, the invention relates to the computer-implemented method for classification according to the invention, wherein the sharpness comprises at least one sharpness metric selected from the group of L* channel metric, angular spectral power density, and radial spectral power density, wherein the L* channel the L* channel of the CIELAB colour space and wherein the angular spectral power density and radial spectral power density are determined from the frequency response on the vascular image.

In certain embodiments, the invention relates to the computer-implemented method for correction according to the invention, wherein the sharpness comprises at least one sharpness metric selected from the group of L* channel metric, angular spectral power density, and radial spectral power density, wherein the L* channel the L* channel of the CIELAB colour space and wherein the angular spectral power density and radial spectral power density are determined from the frequency response on the vascular image.

In certain embodiments, the invention relates to the computer-implemented method for obtainment according to the invention, wherein the sharpness comprises at least one sharpness metric selected from the group of L* channel metric, angular spectral power density, and radial spectral power density, wherein the L* channel the L* channel of the CIELAB colour space and wherein the angular spectral power density and radial spectral power density are determined from the frequency response on the vascular image.

In certain embodiments, the invention relates to the computer-implemented method for classification according to the invention, wherein the L* channel metric is an L* channel-derived Form Factor and/or L* channel-derived Laplacian Energy, wherein the L* channel-derived Form Factor is a measure of the relative L* channel variation between a 2D spatial signal and its first and second derivatives and wherein the Laplacian Energy is a measure of content in a high-frequency band of the image.

In certain embodiments, the invention relates to the computer-implemented method for correction according to the invention, wherein the L* channel metric is an L* channel-derived Form Factor and/or L* channel-derived Laplacian Energy, wherein the L* channel-derived Form Factor is a measure of the relative L* channel variation between a 2D spatial signal and its first and second derivatives and wherein the Laplacian Energy is a measure of content in a high-frequency band of the image.

In certain embodiments, the invention relates to the computer-implemented method for obtainment according to the invention, wherein the L* channel metric is an L* channel-derived Form Factor and/or L* channel-derived Laplacian Energy, wherein the L* channel-derived Form Factor is a measure of the relative L* channel variation between a 2D spatial signal and its first and second derivatives and wherein the Laplacian Energy is a measure of content in a high-frequency band of the image.

The term "L* channel metric", as used herein, refers to a metric obtained from the L channel of the HSL color model and/or the LAB color model. For example, the L-channel can be obtained by conversion of an RGB image to CIELAB (LAB) color space and subsequent extraction the L* channel.

L* channel metric, angular spectral power density, and/radial spectral power density comprise information that is particularly relevant for quality assessment.

Accordingly, the invention is at least in part based on the surprising finding that sharpness in the context of the invention can be determined particularly accurately by using an L* channel metric, angular spectral power density, and/or radial spectral power density.

In certain embodiments, the invention relates to the computer-implemented method for classification according to the invention, the computer-implemented method for correction according to the invention, or the computer-implemented method for obtainment according to the invention, wherein the radial spectral power density is used to determine extreme value distribution.

In certain embodiments, the invention relates to the computer-implemented method for classification according to the invention, wherein the radial spectral power density is used to determine generalized extreme value distribution.

In certain embodiments, the invention relates to the computer-implemented method for correction according to the invention, wherein the radial spectral power density is used to determine generalized extreme value distribution.

In certain embodiments, the invention relates to the computer-implemented method for obtainment according to the invention, wherein the radial spectral power density is used to determine generalized extreme value distribution.

The term "generalized extreme value distribution", as used herein, refers to a combination of type I, II and Ill extreme value distributions and is a form of statistical data distribution that increases sharply on one side with a slow decay on the other, leading to a long-tailed distribution. In some embodiments, a root mean squared error optimization procedure is applied to obtain the best fit generalized extreme value distribution.

The parameters of the best fit generalized extreme value distribution are used to characterize the presence of high-frequency content in the image that corresponds to sharp transitions. Therefore, the use of extreme value distribution, in particular, generalized extreme value distribution contributes to the accurate determination of the sharpness metric.

Accordingly, the invention is at least in part based on the surprising finding that sharpness in the context of the invention can be determined particularly accurately by using generalized extreme value distribution.

In certain embodiments, the invention relates to the computer-implemented method for classification according to the invention, wherein the radial spectral power density is used to determine fractional power in at least one vessel segment.

In certain embodiments, the invention relates to the computer-implemented method for correction according to the invention, wherein the radial spectral power density is used to determine fractional power in at least one vessel segment.

In certain embodiments, the invention relates to the computer-implemented method for obtainment according to the invention, wherein the radial spectral power density is used to determine fractional power in at least one vessel segment.

The term "fractional power", as used herein, refers to an estimate of the total image area with high-frequency features. This estimate is obtained by comparison of structure-related image power to the total image power, wherein the structures are in a certain size range. The radial power spectral density function is considered as a power density function.

The fractional power can be determined from the radial power spectral density of the image by identifying a frequency band based on the expected characteristics of vessels. The fractional power can be determined as the fraction of the total power contained in the frequency band identified accordingly. Higher fractional power indicates more structures in the corresponding range, suggesting better sharpness and more likely presence of structures of interest such as vessels. Therefore, in some embodiments, the fractional power is computed for the high-pass-filtered image.

The fractional power can therefore be used to characterize the presence of sharp features in the vascular image. The total power in a selected band of frequencies and normalize it with total power. The band of frequencies is selected in accordance with the image details of interest, such as rapid variations.

Accordingly, the invention is at least in part based on the surprising finding that sharpness in the context of the invention can be determined particularly accurately by using the determination of fractional power in at least one vessel segment.

In certain embodiments, the invention relates to the computer-implemented method for classification according to the invention, wherein the L* channel metric is an L* channel-derived Form Factor and/or L* channel-derived Laplacian Energy.

In certain embodiments, the invention relates to the computer-implemented method for correction according to the invention, wherein the L* channel metric is an L* channel-derived Form Factor and/or L* channel-derived Laplacian Energy.

In certain embodiments, the invention relates the computer-implemented method for obtainment according to the invention, wherein the L* channel metric is an L* channel-derived Form Factor and/or L* channel-derived Laplacian Energy.

The term "Form Factor", as used herein, refers to a ratio of the standard deviation of the given data to the standard deviation values of the first and second derivatives of the data. The Form Factor characterizes the variability and complexity of the data or a region.

L* channel metrics comprise information that are particularly relevant for efficient quality assessment.

Accordingly, the invention is at least in part based on the surprising finding that sharpness in the context of the invention can be determined particularly accurately by using certain L* channel metrics.

In certain embodiments, the invention relates to the computer-implemented method for classification according to the invention, wherein the vascular image is a retinal image.

In certain embodiments, the invention relates to the computer-implemented method for correction according to the invention, wherein the vascular image is a retinal image.

In certain embodiments, the invention relates to the computer-implemented method for obtainment according to the invention, wherein the vascular image is a retinal image.

The term "retinal image", as used herein, refers to any vascular image of a subject's eye. In some embodiments, the retinal image is a vascular image that comprises a subject's retina or a part thereof. In some embodiments, the retinal image is obtained by a technique selected from the group of direct ophthalmoscopy, indirect ophthalmoscopy, fundus imaging, optical coherence tomography (OCT), OCT angiography, autofluorescence imaging, and adaptive optics scanning laser ophthalmoscopy such as adaptive optics scanning laser ophthalmoscopy. Using the techniques known in the art, several aspects of the eye may be imaged and recorded, thus allowing for analysis of the eye. The retinal images may also be referred to as ophthalmic images, or fundus images, and the like in the art, the exact nomenclature used depending on some factors, such as the type of equipment used, part of the eye being imaged, or combinations thereof. The retinal image useful in the invention is a digital image, wherein the image is obtained directly from an imaging instrument as a digital image or an analog image that has been digitized using techniques known in the art.

In some embodiments, the invention relates to the method according to the invention, wherein the vascular image is a retinal image and the predefined image quality threshold pattern comprises a threshold to obtain an image and/or at least one class of images by the methods described herein to have sufficient quality for grading and/or diagnosis of at least one indication selected from the group retinopathy of prematurity, diabetic retinopathy, and aggressive posterior retinopathy of prematurity.

Retinal images, e.g., retinal images obtained from fundus cameras often have limitations of low contrast (such as the contrast between retinal vasculature and background), image noise and non-uniform illumination, especially towards the periphery of the retina.

Accordingly, the invention is at least in part based on the surprising finding that it is particularly accurate for retinal images.

In certain embodiments, the invention relates to the computer-implemented method for classification according to the invention, wherein the sharpness metric, the brightness metric, and/or the contrast metric determined in a field of view mask area of the retinal image.

In certain embodiments, the invention relates to the computer-implemented method for correction according to the invention, wherein the sharpness metric, the brightness metric, and/or the contrast metric determined in a field of view mask area of the retinal image.

In certain embodiments, the invention relates to the computer-implemented method for obtainment according to the invention, wherein the sharpness metric, the brightness metric, and/or the contrast metric determined in a field of view mask area of the retinal image.

The term "field of view mask area", as used herein, refers to the image area of the retinal image that represents the tissue. In some embodiments, the field of view mask is obtained by a method comprising the steps of: a) binarizing a retinal image; b) applying a morphological operator to separate tissue area from the non-tissue area; and c) obtaining a visual field mask from the morphological operators in step b). In some embodiments, the morphological operators described herein are selected from the group of Hit-or-miss transform, dilation, erosion, opening, closing, granulometry, thinning, skeletonization, ultimate erosion, flood filling and conditional bisector. Therefore, the field of view mask excludes the area(s) of the image that consist(s) of technical artefacts or comprise(s) to a large extent technical artefacts. Some methods for obtaining vascular images such as methods for obtaining retinal images generate black and/or blurry areas at the edges of the image do not represent the biology or the actual appearance of the captured tissue. In some embodiments, the field of view mask area excludes areas at the edges of the image comprising primarily blurry image parts. In some embodiments, the field of view mask area excludes areas at the edges of the image comprising primarily black pixels. In some embodiments, the field of view mask area is a roundish, elliptical or round shape on a rectangular image or square image.

Edge artefacts, such as dark edge artefacts of a fundus image, can distort brightness measurements (see, e.g., FIG. 15).

By the limitation of the image quality determination to an area within a field of view mask, the image quality pattern can embody the image quality that represents the biologic tissue on the image and is therefore primarily relevant for further uses such as grading and/or diagnosing.

In certain embodiments, the invention relates to the computer-implemented method for classification according to the invention, wherein the method comprises a step of extending the field of view mask area.

In certain embodiments, the invention relates to the computer-implemented method for correction according to the invention, wherein the method comprises a step of extending the field of view mask area.

In certain embodiments, the invention relates to the computer-implemented method for obtainment according to the invention, wherein the method comprises a step of extending the field of view mask area.

In some embodiments, the field of view mask area is extended by increasing the size of the field of view mask area with pixels having the average brightness of the brightness determined within the field of view mask.

In some embodiments, the field of view mask area is extended by increasing the size of the field of view mask area to a rectangle. In some embodiments, the field of view mask area is extended by increasing the size of the field of view mask area to a rectangle of the original vascular image. In some embodiments, the field of view mask area is extended by the steps described in FIG. 13.

By the extension of the FOV mask the artifacts that are produced by various filters when they encounter the abrupt change in intensity at the edge of the FOV are removed. This approach of extending the FOV mask allows a data window to be applied that gradually reduces the image intensity toward the edges, rather than abruptly as is the case with the FOV. Additionally, extending the FOV mask enables having consistent results from image to image, regardless of the size or shape of the original FOV.

Therefore, extending the field of view mask to a more processable and/or standardized shape improves the methods described herein (see, e.g. FIG. 17).

Accordingly, the invention is at least in part based on the surprising finding that brightness in the context of the invention can be determined particularly accurately by using an extended field mask area.

In certain embodiments, the invention relates to the computer-implemented method for classification according to the invention, wherein the contrast metric comprises determining an ONH segmentation.

In certain embodiments, the invention relates to the computer-implemented method for correction according to the invention, wherein the contrast metric comprises determining of an ONH segmentation.

In certain embodiments, the invention relates to the computer-implemented method for obtainment according to the invention, wherein the contrast metric comprises determining an ONH segmentation.

Some methods for vessel detection cannot distinguish or cannot robustly distinguish between vessel and ONH. Therefore, the method of the invention is particularly accurate, if vessel segments and ONH segments are distinguishable e.g. by segmentation by separate methods.

The term "ONH segmentation", as used herein, refers to segmentation that results in an optic nerve head area. In some embodiments, the optic nerve head area is identified by comparing the vascular image to an optic nerve head reference pattern. In some embodiments, several areas are detected during the process of ONH segmentation and are subsequently reduced (e.g., by exclusion of areas or area fusion) to one single optic nerve head area. In some embodiments, the optic nerve head reference pattern described herein is obtainable by a machine-learning technique. In some embodiments, a supervised machine learning technique is used to generate the optic nerve head reference pattern described herein. In some embodiments, the supervised machine learning technique described herein is a trained convolutional neural network, such as a deep convolutional neural network. In some embodiments, the supervised machine learning technique described herein is trained and/or validated using labeled data (see e.g., FIG. 19, FIG. 21).

The ONH and its center can be determined for example via two methods: 1. Applying phase-portrait analysis on the Gabor angle image 2. Inference using a pretrained deep-learning convolutional neural network meant for the detection of the ONH.

The optic nerve head on the vascular image comprises significant biological and diagnostic information. Therefore, the properties and/or the image quality of the ONH segment is particularly relevant for subsequent grading and/or diagnosing. An abnormal optic nerve head (e.g., an enlarged optic nerve head) may facilitate gradability. Therefore, an image demonstrating an abnormal optic nerve head may be considered to have an increased corrected image quality score.

In some embodiments, at least one property of the ONH segment(s) influence(s) the corrected image quality score. In some embodiments, the property of the ONH segment(s) is at least one property selected from the group of location, form (e.g., circularity or aspect ratio), and size. In some embodiments, the vessel segment described herein is determined with the 1.1.2.2 vessel detection module (FIG. 11).

Accordingly, the invention is at least in part based on the surprising finding that contrast in the context of the invention can be determined particularly accurately by using ONH segmentation.

The present invention may be a system, a method, and/or a computer program product.

The computer program product may include a computer-readable storage medium (or media) having the computer-readable program instructions thereon for causing a processor to carry out embodiments of the invention such as the computer-implemented method for classification according to the invention and/or the computer-implemented method for obtainment according to the invention.

Computer-readable program instructions described herein can be downloaded to respective computing/processing devices from a computer-readable storage medium or to an external computer or external storage device via a network.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages.

The computer-readable program instructions may execute entirely on the user's computer, partly on the user's computer, as a stand-alone software package, partly on the user's computer and partly on a remote computer or entirely on the remote computer or server.

In certain embodiments, the invention relates to a storage device comprising the computer-implemented method for classification according to the invention.

In certain embodiments, the invention relates to a storage device comprising the computer-implemented method for correction according to the invention.

In certain embodiments, the invention relates to a storage device comprising the computer-implemented method for obtainment according to the invention.

In certain embodiments, the invention relates to a storage device comprising the computer-implemented method for correction according to the invention and the computer-implemented method for obtainment according to the invention.

In certain embodiments, the invention relates to a storage device comprising the computer-implemented method for classification according to the invention and the computer-implemented method for obtainment according to the invention.

In certain embodiments, the invention relates to a storage device comprising the computer-implemented method for classification according to the invention and the computer-implemented method for correction according to the invention.

In certain embodiments, the invention relates to a storage device comprising the computer-implemented method for classification according to the invention, the computer-implemented method for correction according to the invention and the computer-implemented method for obtainment according to the invention.

In some embodiments, the methods described herein are comprised in form of computer executable instructions (e.g. in form of a program or software) on the storage device.

The term "storage device", as used herein, refers to any tangible device that can retain and store instructions for use by an instruction execution device.

In some embodiments, the storage device described herein is at least one selected from the group of electronic storage device, magnetic storage device, optical storage device, electromagnetic storage device, semiconductor storage device, any suitable combination thereof.

A non-exhaustive list of more specific examples of the storage device includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In certain embodiments, the invention relates to a server comprising the storage device of the invention and a network connection for receiving data indicative for the vascular image.

In certain embodiments, the invention relates to a server comprising the storage device of the invention and at least one processing device capable of executing computer execution instructions and a network connection for receiving data indicative for the vascular image.

In certain embodiments, the invention relates to a system for capturing a quality-classified vascular image, wherein the system comprises a) an image capturing device; and b) i) at least one processing device capable of executing computer execution instructions and the storage device of the invention; and/or ii) a network connection to a server according to the invention.

The term "data indicative for the vascular image", as used herein, refers to any raw or processed data that describes the vascular image and/or properties of the vascular image.

The term "network connection", as used herein, refers to a communication channel of a data network. A communication channel can allow at least two computing systems to communicate data to one another. In some embodiments, the data network is selected from the group of the internet, a local area network, a wide area network, and a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

The server described herein, can receive the vascular image, process it according to the method of the invention, and provide a result. Sending the vascular image to a server reduces the requirements for processing power in the device that acquires the vascular image and enables the efficient processing of large datasets. In embodiments, wherein the invention relates to a server, the vascular image can be obtained acquired by any device that has a network connection. In some embodiments, the device for the acquirement of the vascular image is a mobile device.

The server may be connected to the device for the acquirement of the vascular image through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform embodiments of the present invention.

Accordingly, the server described herein, enables the efficient application of the methods of the invention.

In certain embodiments, the invention relates to a system for capturing a quality-classified vascular image, wherein the system comprises at least one processing device and the storage device of the invention.

In certain embodiments, the invention relates to a system for capturing a quality-classified vascular image, wherein the system comprises a network connection to the server of the invention.

In certain embodiments, the invention relates to a system for capturing a quality-classified vascular image, wherein the system comprises a) at least one processing device and the storage device of the invention; and b) a network connection to the server of the invention.

In some embodiments, the system described herein is a system selected from the group of portable imaging system, microscope-based imaging system, wide-field imaging system, automated imaging system, robotic imaging system, stereoscopic imaging system, and contact imaging system.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

"a," "an," and "the" are used herein to refer to one or to more than one (i.e., to at least one, or to one or more) of the grammatical object of the article.

"or" should be understood to mean either one, both, or any combination thereof of the alternatives.

"and/or" should be understood to mean either one, or both of the alternatives.

Throughout this specification, unless the context requires otherwise, the words "comprise", "comprises" and "comprising" will be understood to imply the inclusion of a stated step or element or group of steps or elements but not the exclusion of any other step or element or group of steps or elements.

The terms "include" and "comprise" are used synonymously. "preferably" means one option out of a series of options not excluding other options. "e.g." means one example without restriction to the mentioned example. By "consisting of" is meant including, and limited to, whatever follows the phrase "consisting of."

The terms "about" or "approximately", as used herein, refer to "within 20%", more preferably "within 10%", and even more preferably "within 5%", of a given value or range.

Reference throughout this specification to "one embodiment", "an embodiment", "a particular embodiment", "a related embodiment", "a certain embodiment", "an additional embodiment", "some embodiments", "a specific embodiment" or "a further embodiment" or combinations thereof means that a particular feature, structure or characteristic described in connection with the embodiment is included in at least one embodiment of the present invention. Thus, the appearances of the foregoing phrases in various places throughout this specification are not necessarily all referring to the same embodiment. Furthermore, the particular features, structures, or characteristics may be combined in any suitable manner in one or more embodiments. It is also understood that the positive recitation of a feature in one embodiment, serves as a basis for excluding the feature in a particular embodiment.

BRIEF DESCRIPTION OF FIGURES

FIG. 15: Example images of generated FOV mask thereof

FIG. 17: Steps in segmentation of the brightness image

FIG. 18: Example images and enhanced versions thereof (A and B)

FIG. 21: Segmentation of the ONH of an example retinal mage A) Original input image B) Original input image with the detected ONH boundary overlaid on top of it C) Binary mask of the detected ONH area of Input image.

FIG. 22: Examples of Super Pixel segmentation of the Superpixel Module

Figure 1:
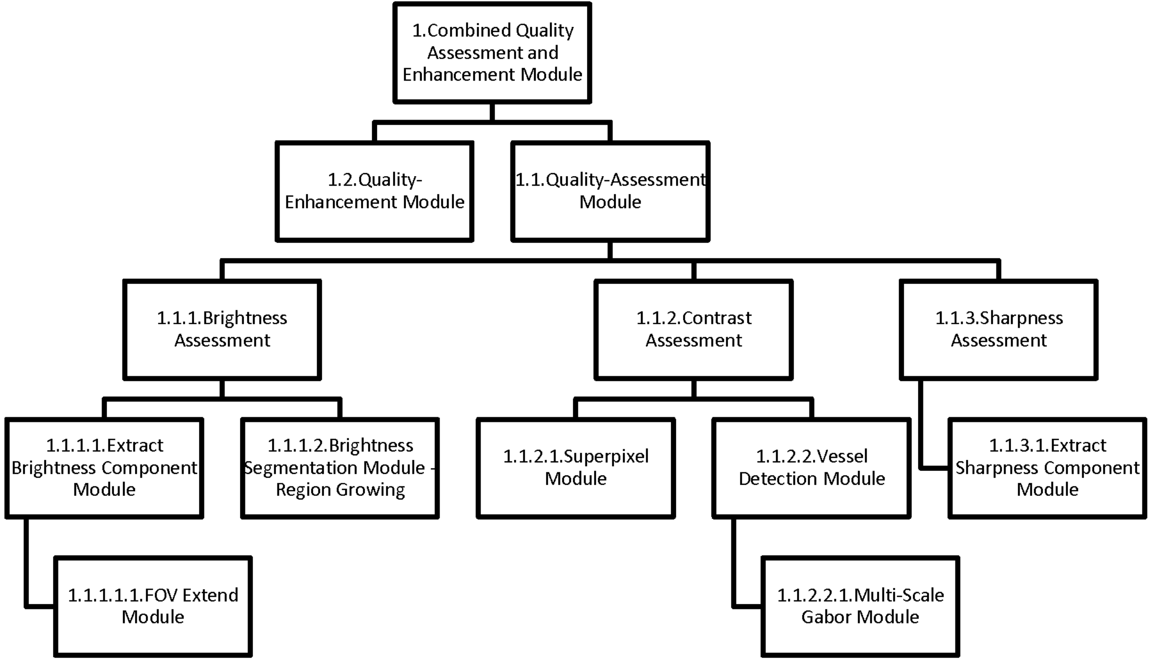
FIG. 1: Overview
Figure 2:
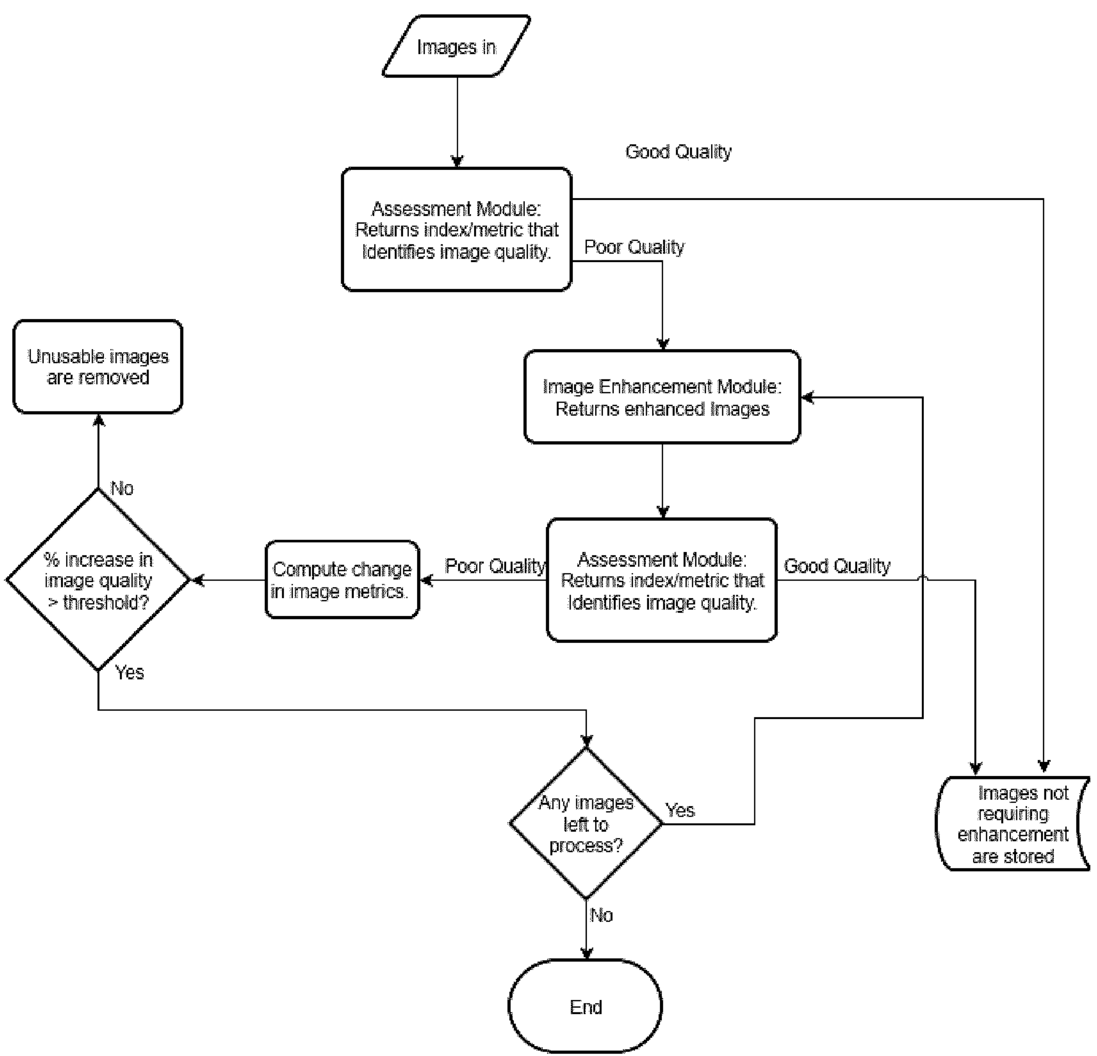
FIG. 2: 1. Combined Quality Assessment and Enhancement Module
Figure 3:
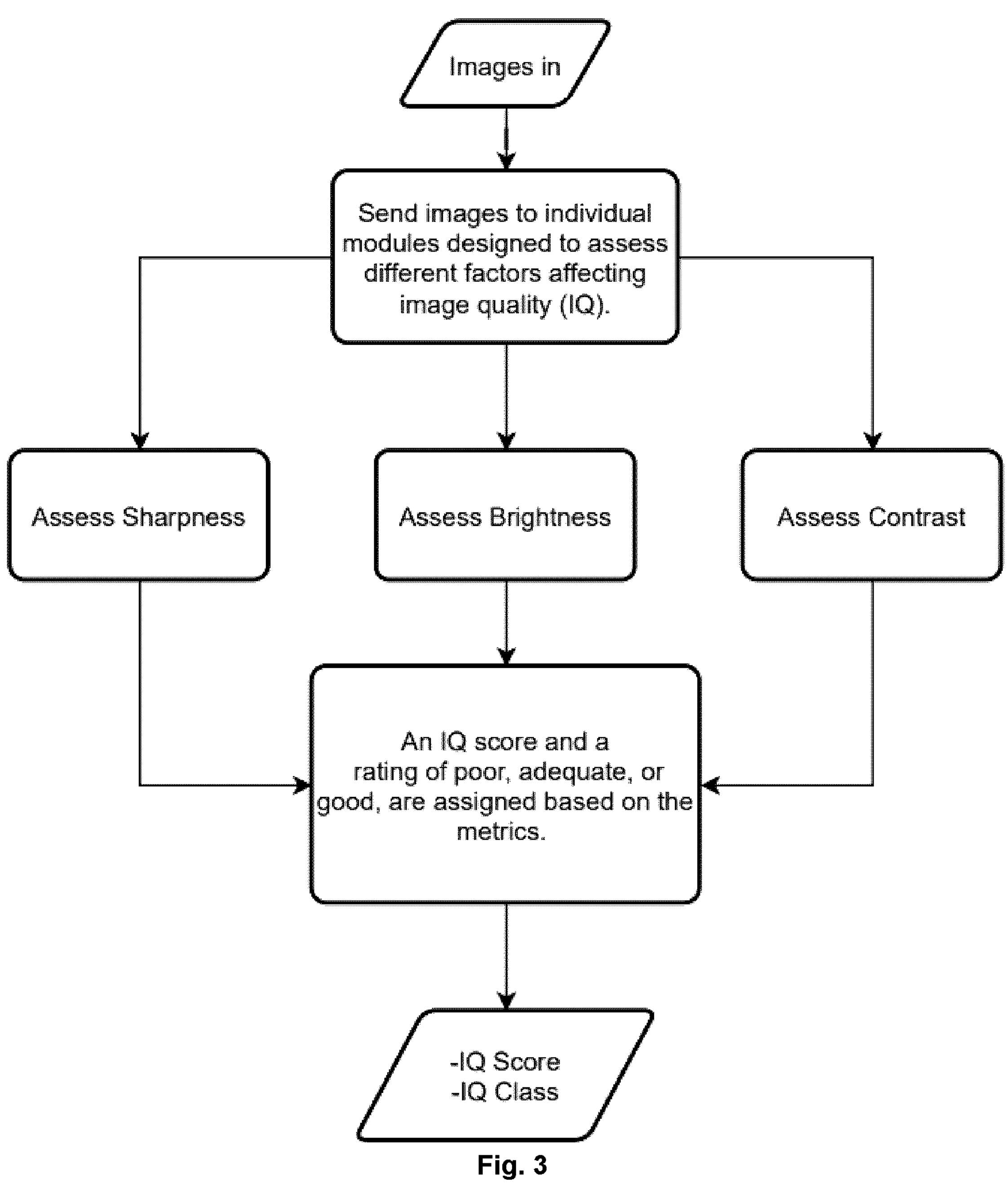
FIG. 3: 1.1. Quality-Assessment Module
Figure 4:
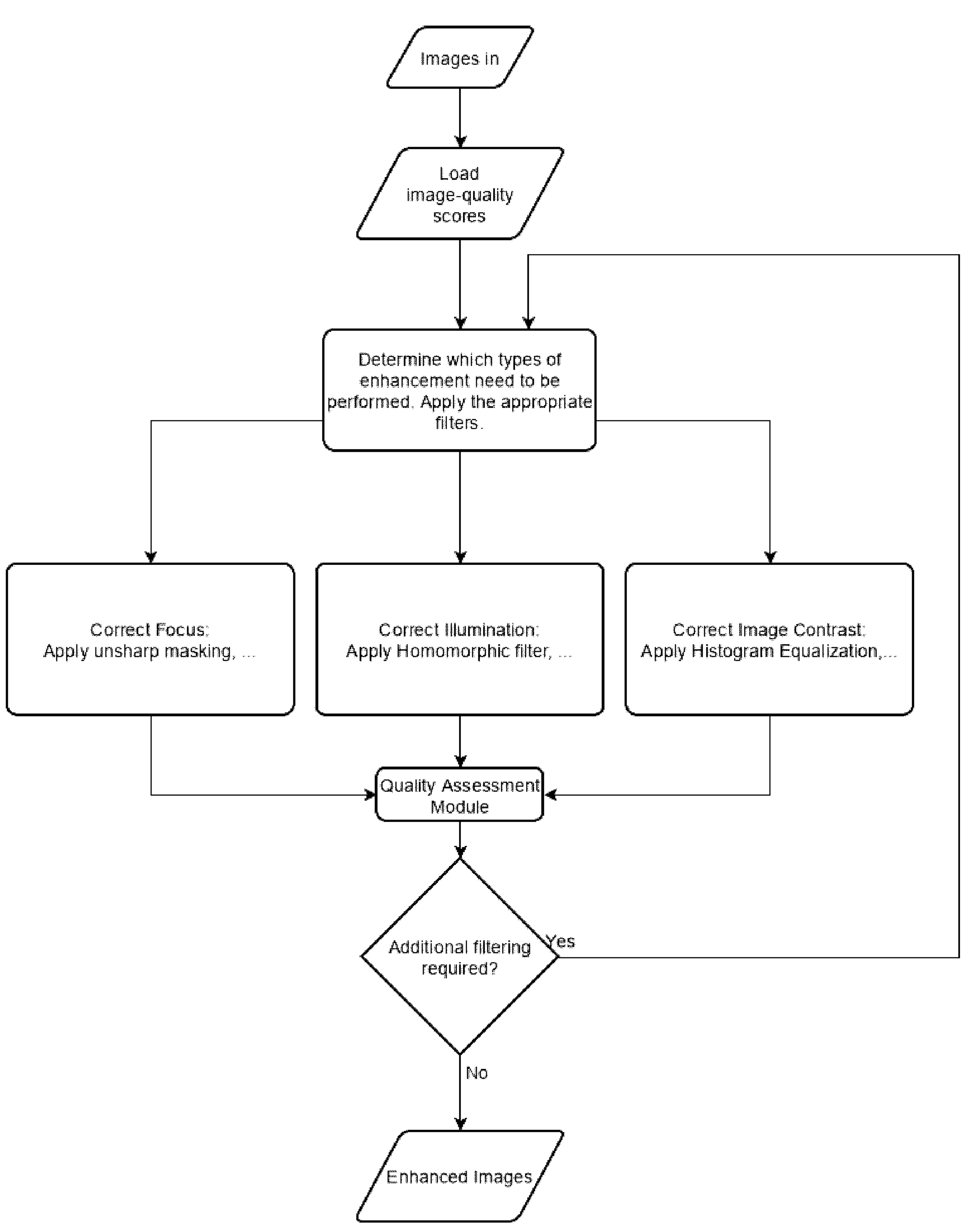
FIG. 4: 1.2. Quality-Enhancement Module
Figure 5:
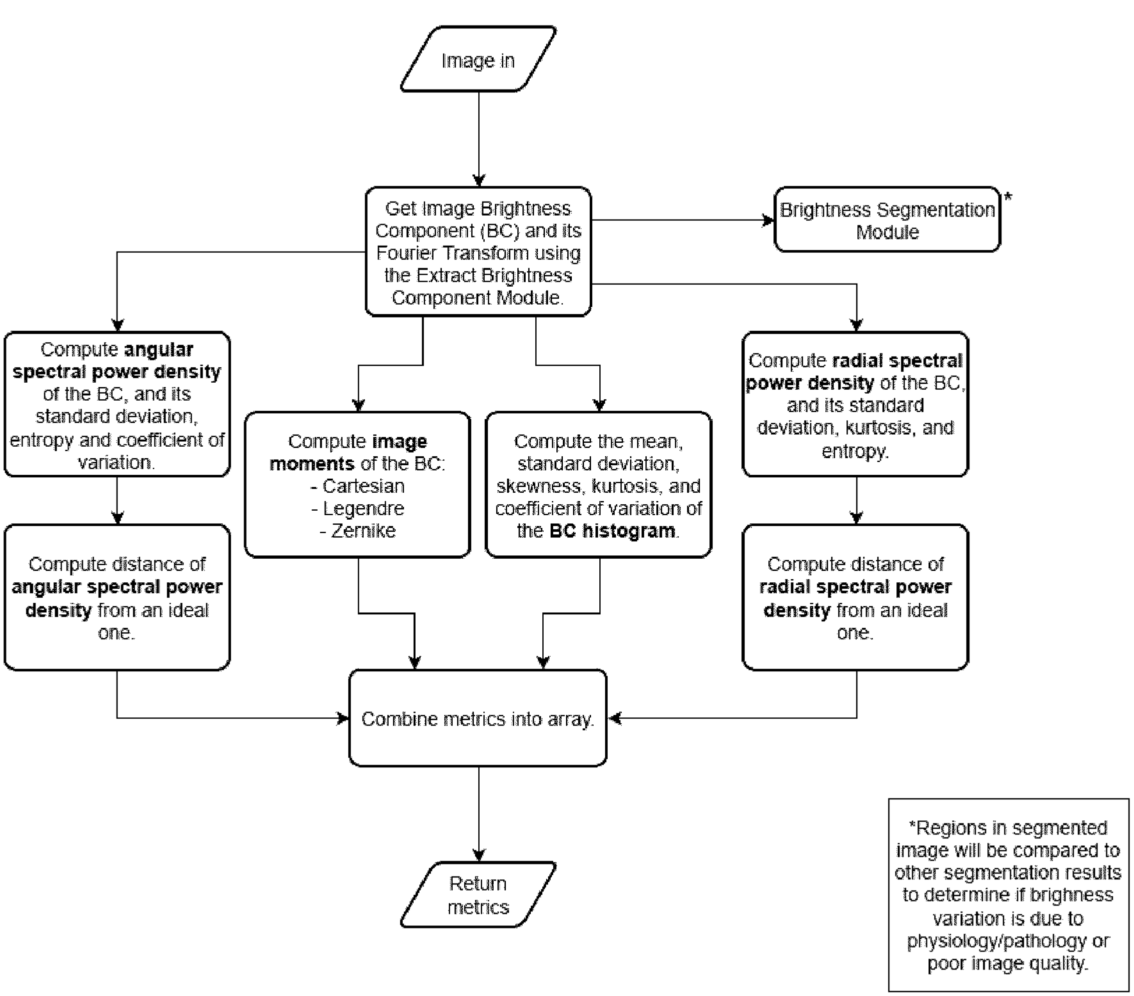
FIG. 5: 1.1.1. Brightness Assessment
Figure 6:
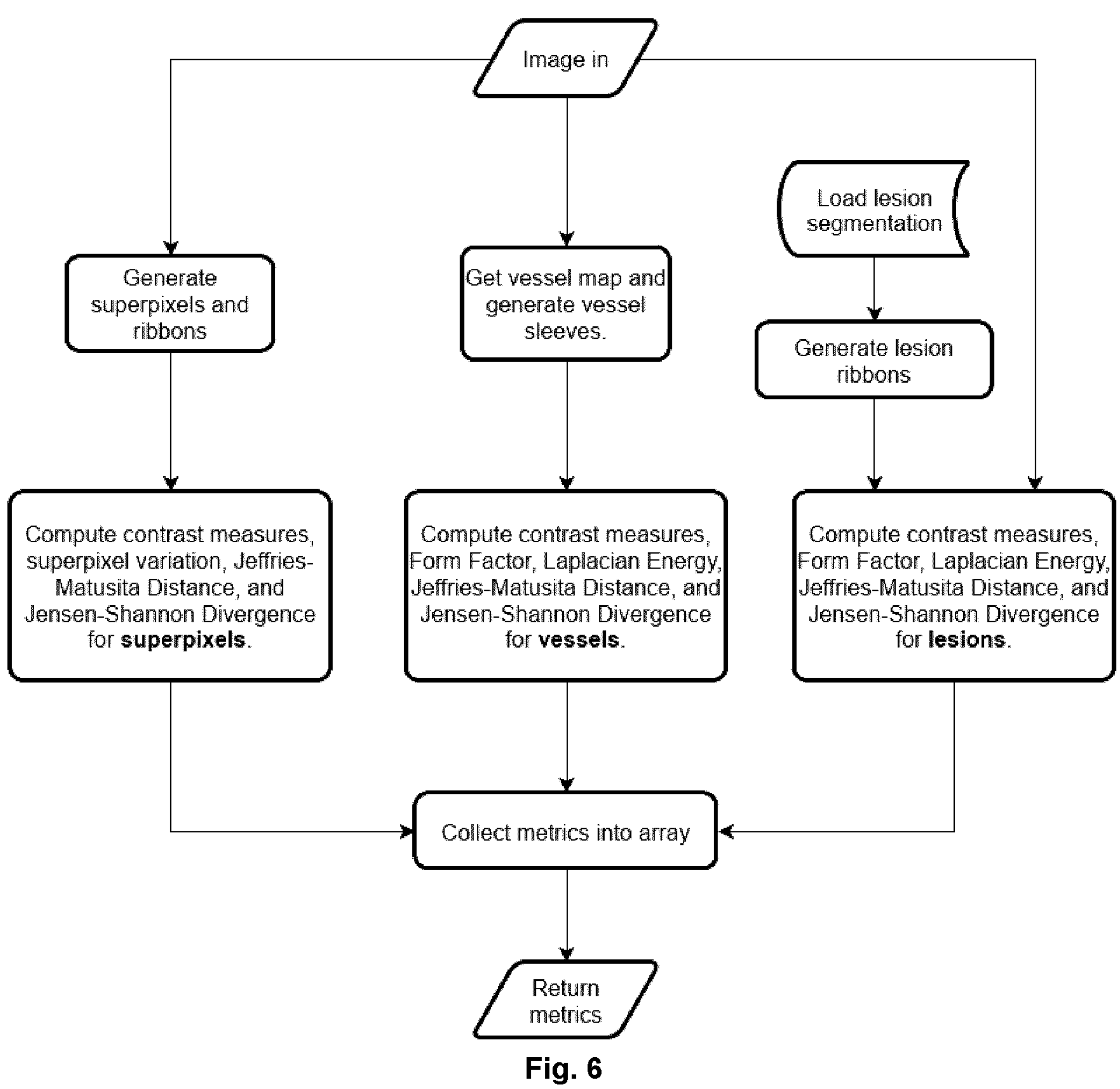
FIG. 6: 1.1.2. Contrast Assessment
Figure 7:
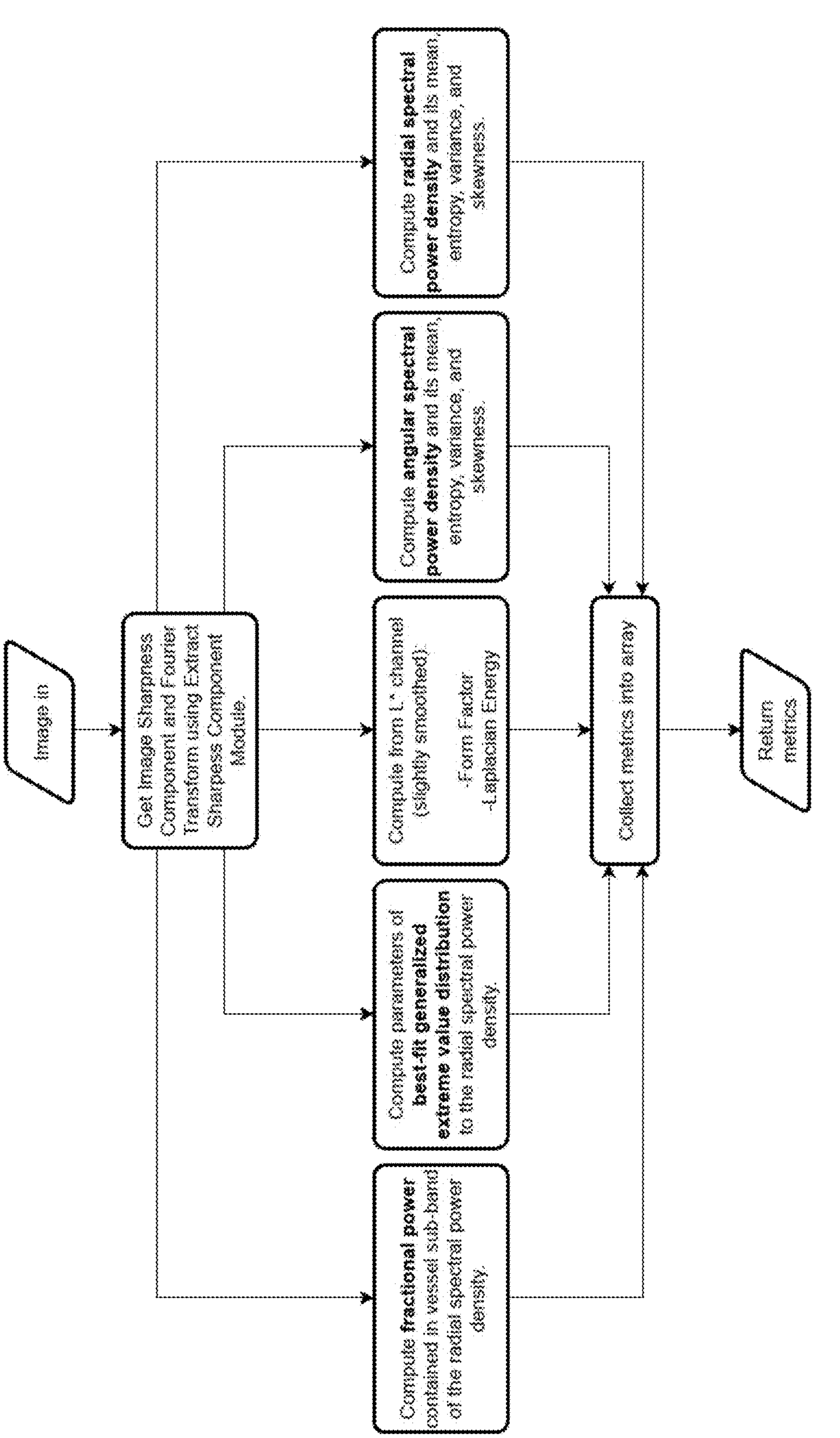
FIG. 7: 1.1.3. Sharpness Assessment
Figure 8:
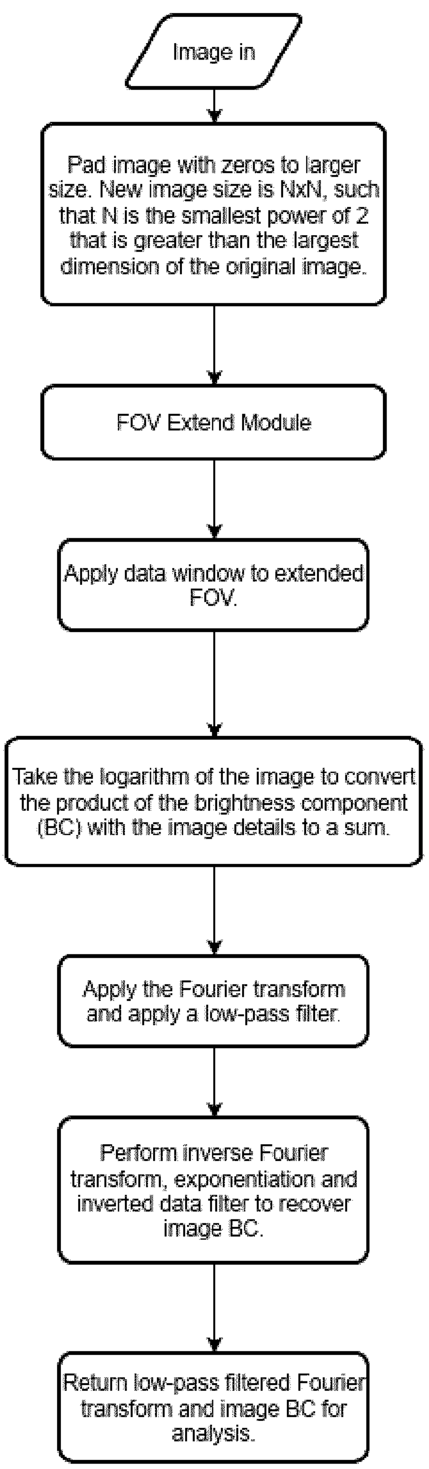
FIG. 8: 1.1.1.1. Extract Brightness Component Module
Figure 9:
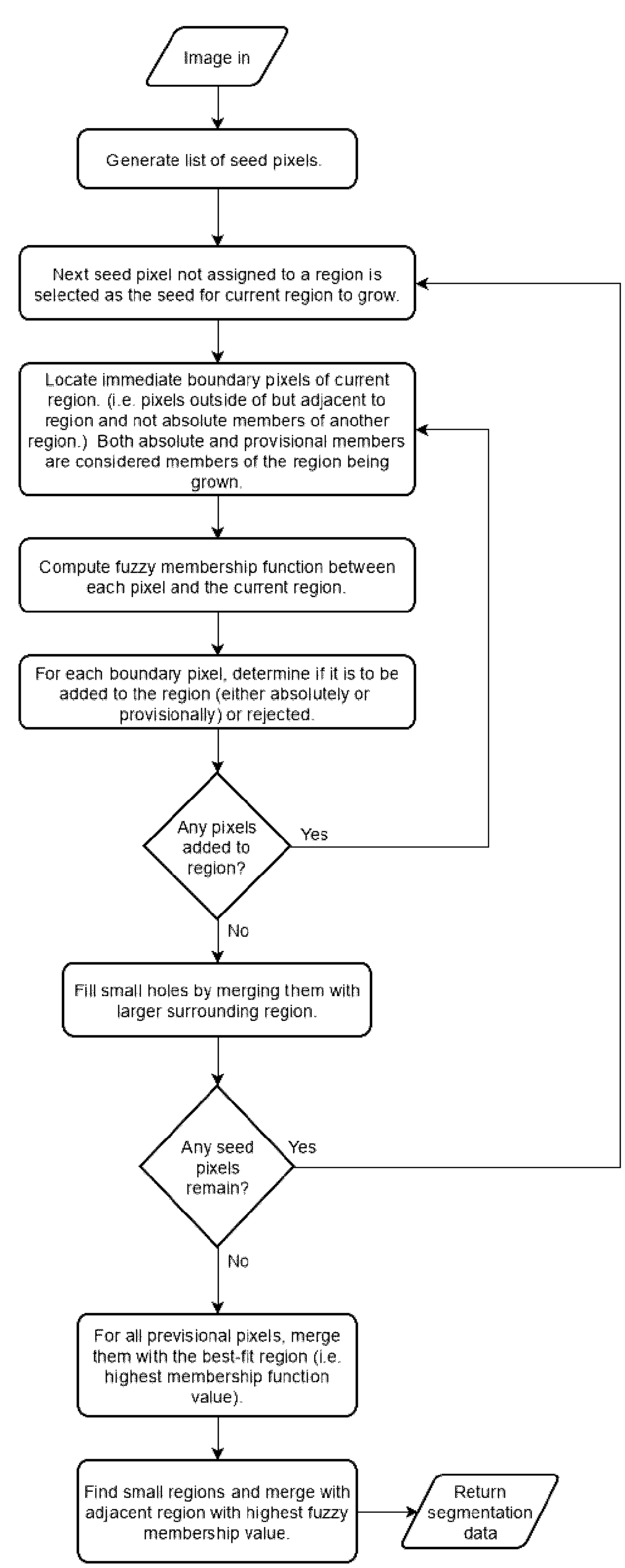
FIG. 9: 1.1.1.2. Brightness Segmentation Module-Region Growing
Figure 10:
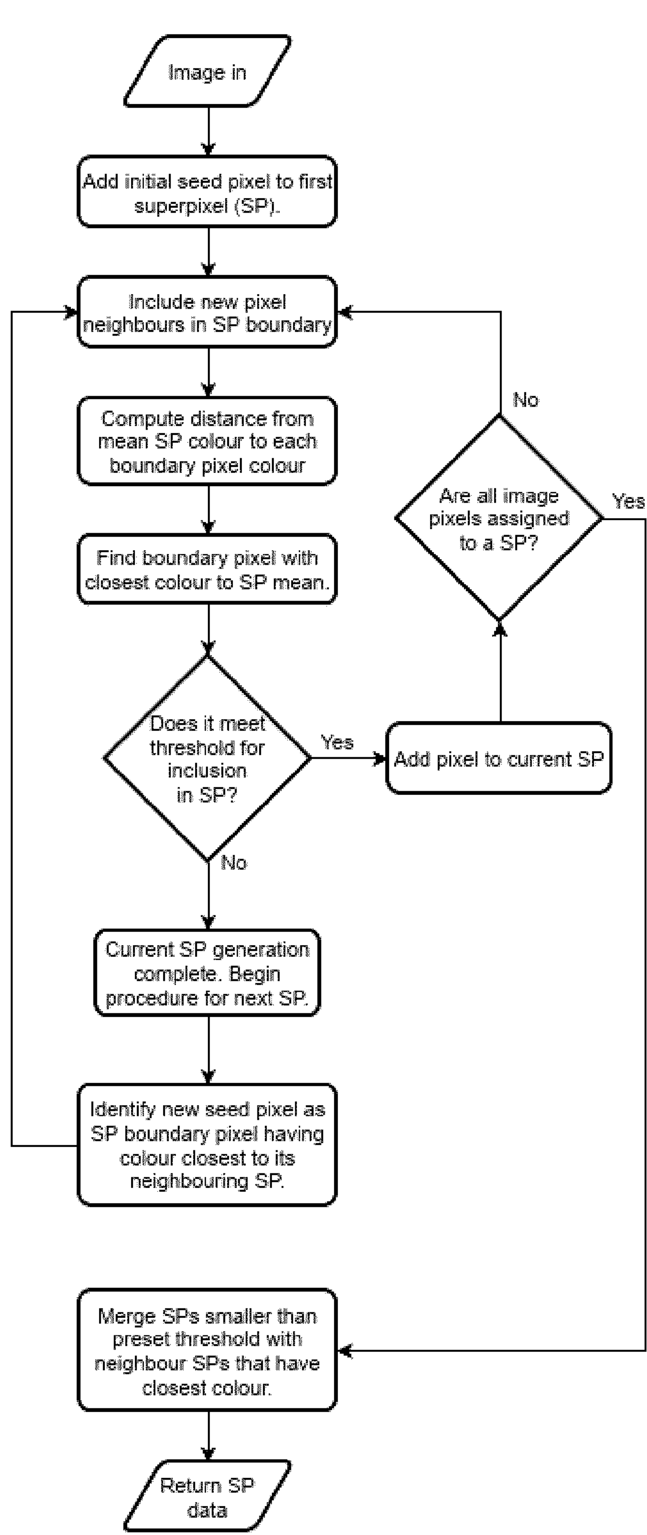
FIG. 10: 1.1.2.1. Superpixel Module
Figure 11:
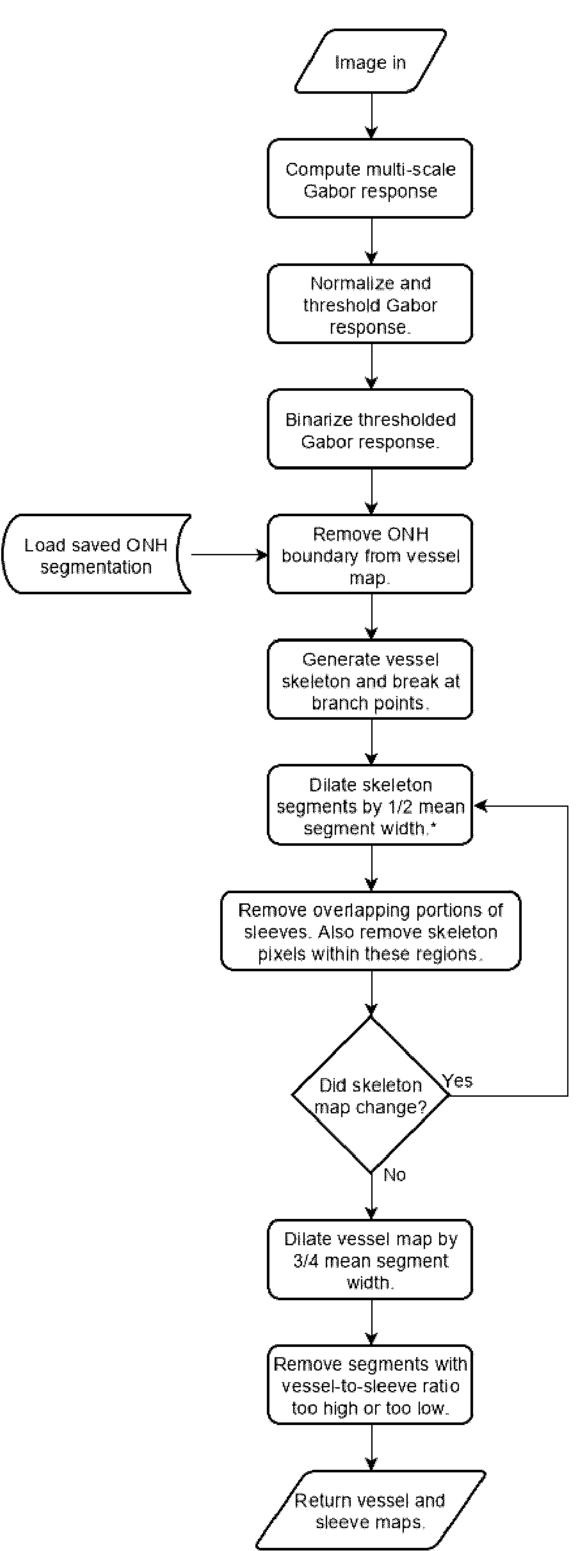
FIG. 11: 1.1.2.2. Vessel Detection Module
Figure 12:
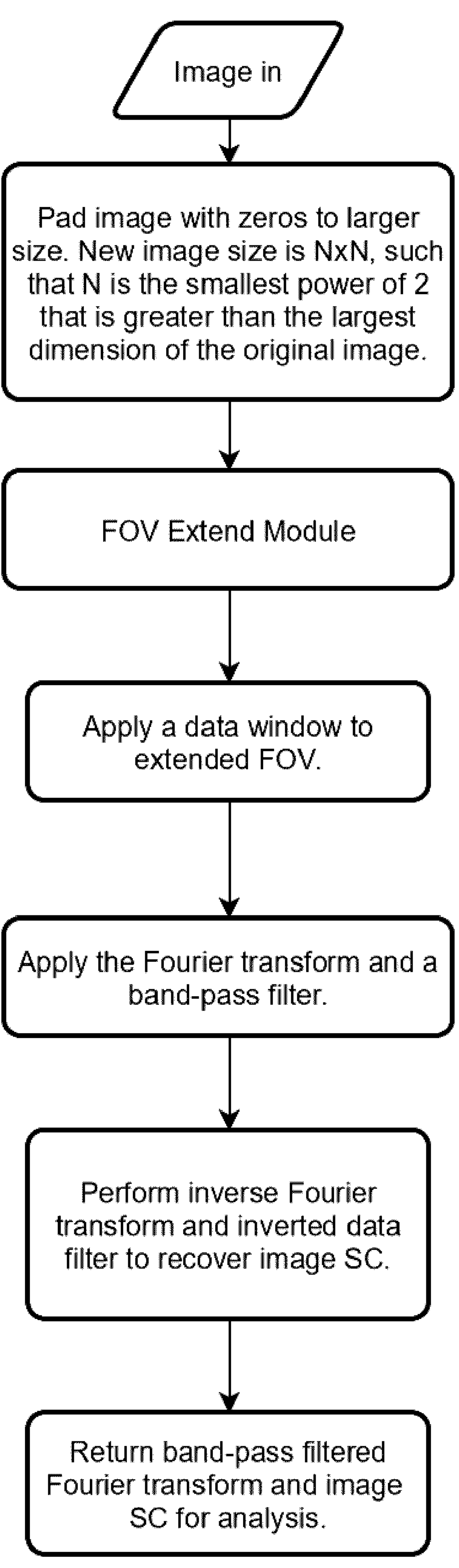
FIG. 12: 1.1.3.1. Extract Sharpness Component Module
Figure 13:
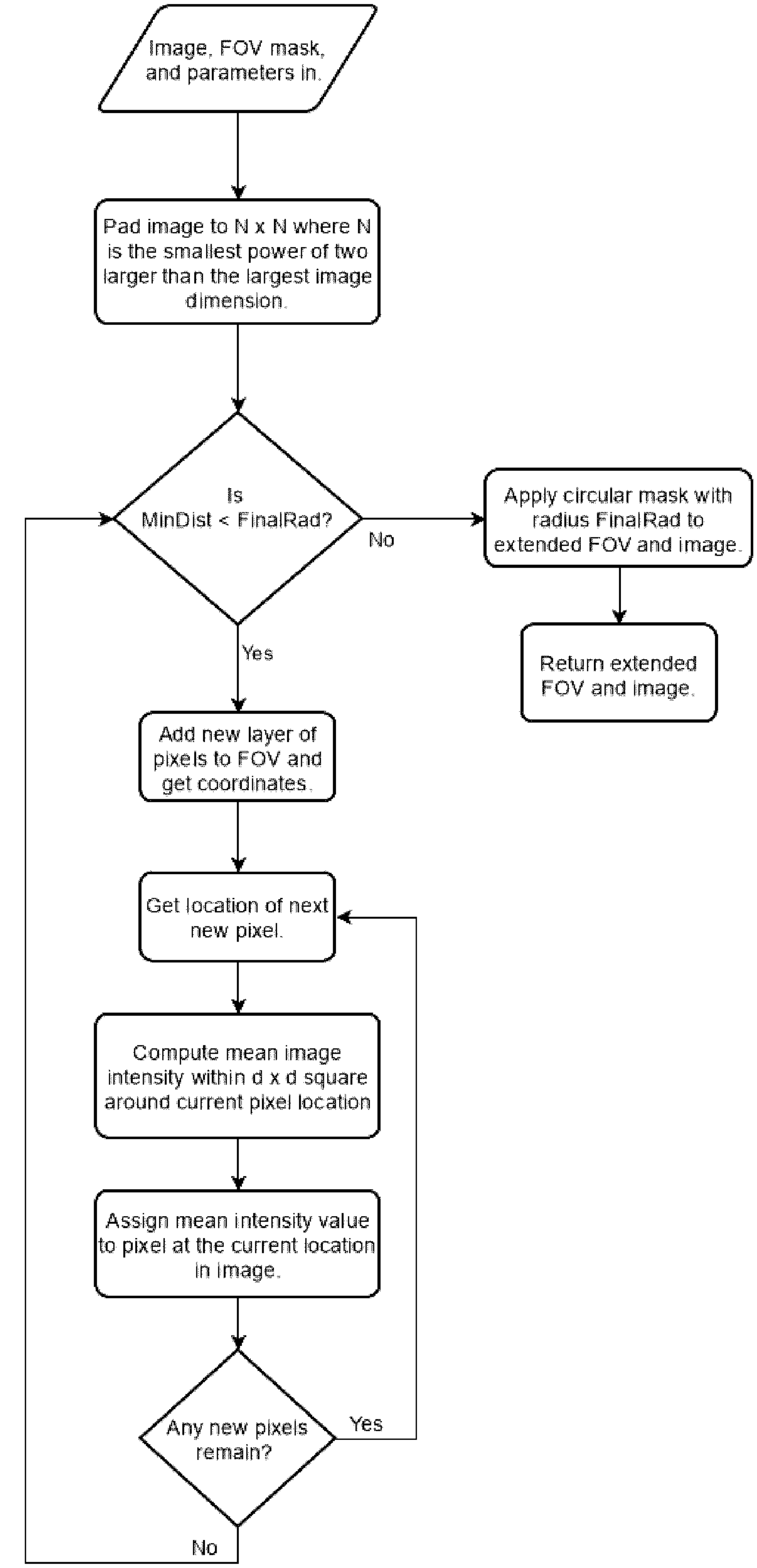
FIG. 13: 1.1.1.1.1. FOV Extend Module
Figure 14:
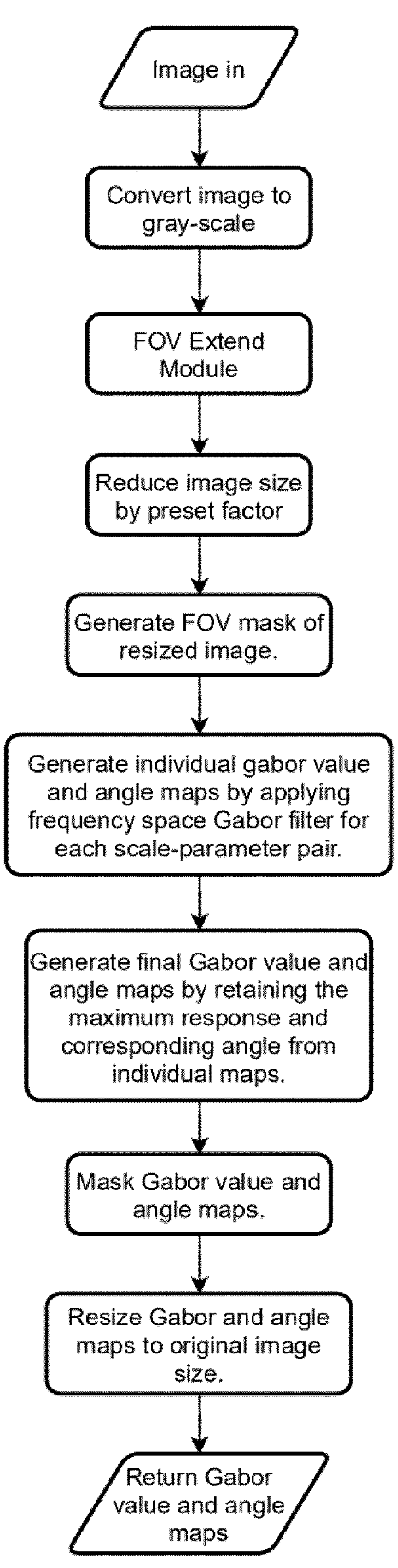
FIG. 14: 1.1.2.2.1. Multi-Scale Gabor Module
Figure 16:
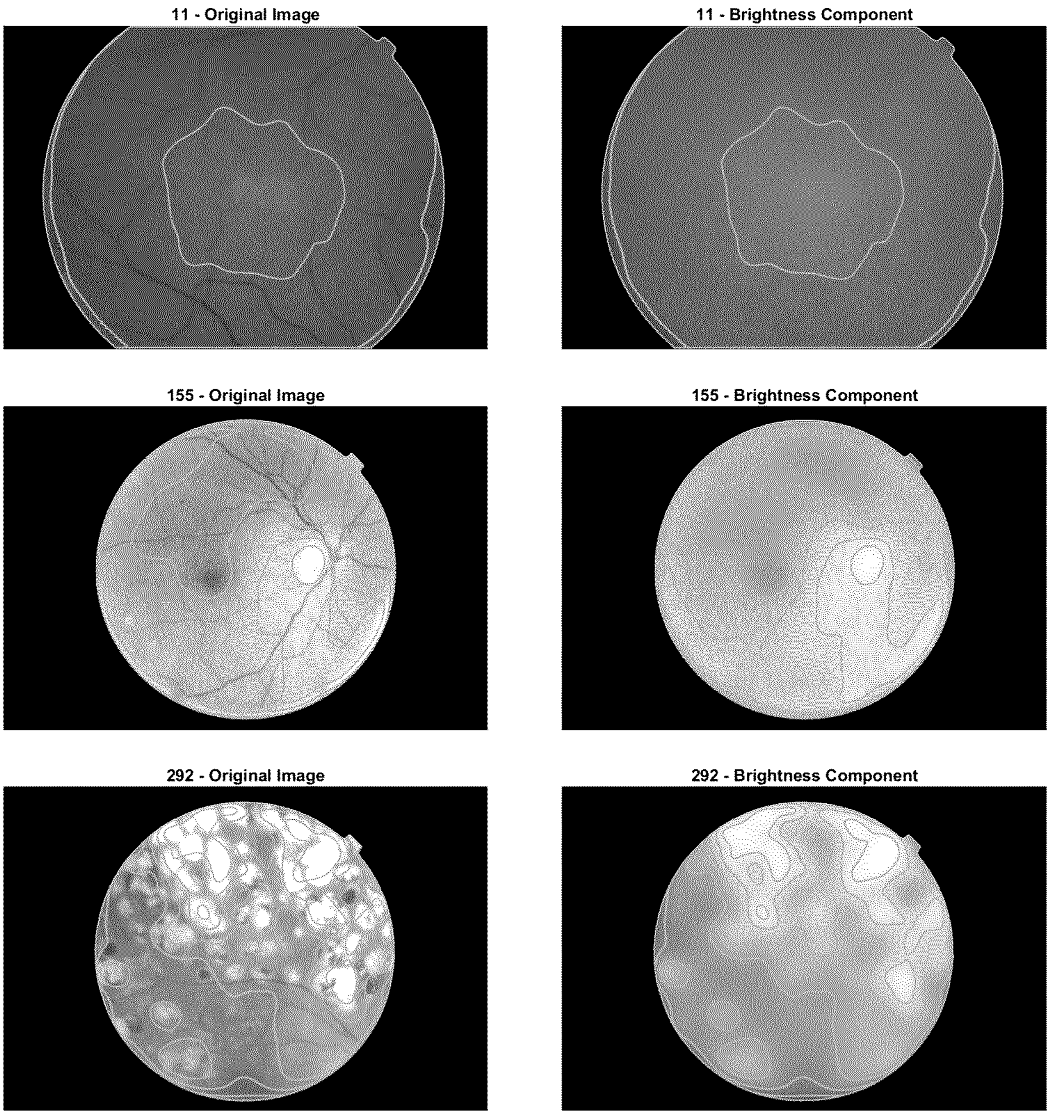
FIG. 16: Brightness segmentation. The images on the left row show the brightness segmentation, obtained from the brightness images to their right, overlaid on the original color image.

In general, the term "module," as used herein, refers to logic embodied in hardware or firmware, or to a collection of software instructions, possibly having entry and exit points, written in a programming language, such as, for example, Python, Java, Lua, C and/or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer-readable storage device. Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The block diagrams disclosed herein may be implemented as modules. The modules described herein are preferably implemented as software modules but may be represented in hardware or firmware. Generally, the modules described herein refer to logical modules that may be combined with other modules or divided into sub-modules despite their physical organization or storage. Therefore, the modules described herein may be combined in any way that enables the desired result. In some embodiments, the modules are combined as described in FIG. 1.

Unless otherwise defined, all technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

The general methods and techniques described herein may be performed according to conventional methods well known in the art and as described in various general and more specific references that are cited and discussed throughout the present specification unless otherwise indicated.

While aspects of the invention are illustrated and described in detail in the figures and foregoing description, such illustration and description are to be considered illustrative or exemplary and not restrictive. It will be understood that changes and modifications may be made by those of ordinary skill within the scope and spirit of the following claims. In particular, the present invention covers further embodiments with any combination of features from different embodiments described above and below.

Although the foregoing invention has been described in some detail by way of illustration and example for purposes of clarity of understanding, it will be obvious that certain changes and modifications may be practiced within the scope of the appended claims.

EXAMPLES

Example 1

The modules were implemented using Matlab software and the modules as described in FIGS. 1 to 14. The classification for quality was done using a trained linear discriminant classifier that via training, determines certain boundaries that will separate the quality of images into 3 classes. The following Matlab packages were used: Statistics and Machine Learning Toolbox, Optimization Toolbox, Global Optimization Toolbox, Image Processing Toolbox. The linear discriminant classifier was trained on a set of 500 images that were labelled for image quality. Two imaging technicians were employed to provide ratings of 1 (poor) to 3 (good) for overall image quality, as well as sharpness, contrast, and brightness individually. The images were obtained from healthy and non-healthy patients of varying severity. A subset of these images that were identically labelled by both were used for training/testing. For testing/training 334 images were used. Random splits or fold as well as the leave-one-out approach were used for training and testing with this set. The leave-one-out method was used for classification, i.e., at each step, 1 image was kept for testing and 333 are used for training.

Statistical results for validation on 334 (out of 500) images that had consensus:

Sensitivity of Class 1: 0.86
Specificity of Class 1: 0.99
PPV of Class 1: 0.95
NPV of Class 1: 0.98
Sensitivity of Class 2: 0.97
Specificity of Class 2: 0.86
PPV of Class 2: 0.92
NPV of Class 2: 0.95
Sensitivity of Class 3: 0.86
Specificity of Class 3: 0.98
PPV of Class 3: 0.94
NPV of Class 3: 0.96
Avg. Sen.=90%
Avg. Spe.=95%
Avg. PPV=94%
Avg. NPV=96%

| | | | | | | |
|---|---|---|---|---|---|---|
| True Class | 1 | 37 | 6 | 0 | 37/43 = 86.05% | Class. Acc. |
| | 2 | 2 | 206 | 4 | 206/212 = 97.17% | |
| | 3 | 0 | 11 | 68 | 68/79 = 86.08% | |
| | | 1 | 2 | 3 | 311/334 = 93.11% | |
| | | | Predicted Class | | | |

Example 2 Field of View Mask Generation

The field of view mask generation comprised the steps of:

Saturate top and bottom limits of gray-scale value (clip) and adjust the original intensity values to the new limit
Apply gamma correction to the gray-scale image
Perform Ridler-Calvard binarization
Keep the largest size binary object left as the FOV candidate
Pad the image for post processing
Apply morphological operation of closing followed by erosion with a disk element, and finally filling of holes
Remove padding, produce final FOV
Exemplified results are demonstrated in FIG. 15.

Example 3

Image correction by Homomorphic_contrast_sharpness exemplified in FIG. 18.

Example 4 Vessel and ONH Detection

Figure 19:
FIG. 19: Segmentation of vessels in an example retinal mage. A) Input image; B) Gabor Magnitude Response of Input image; C) Binary map of detected vessels based on the Gabor Magnitude Response of Input image; D) Ground-truth hand-annotation of Input image; E) Vessel Sleeves associated with Input image as used for vessel-contrast measurement
Figure 19:
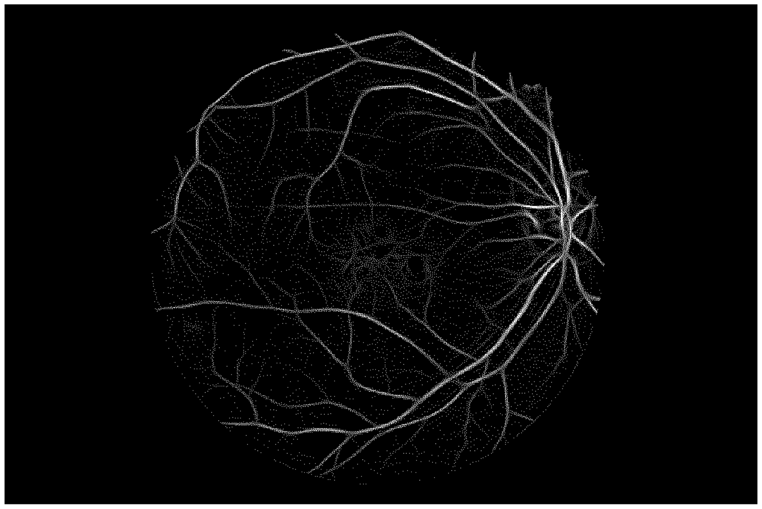
Figure 19:
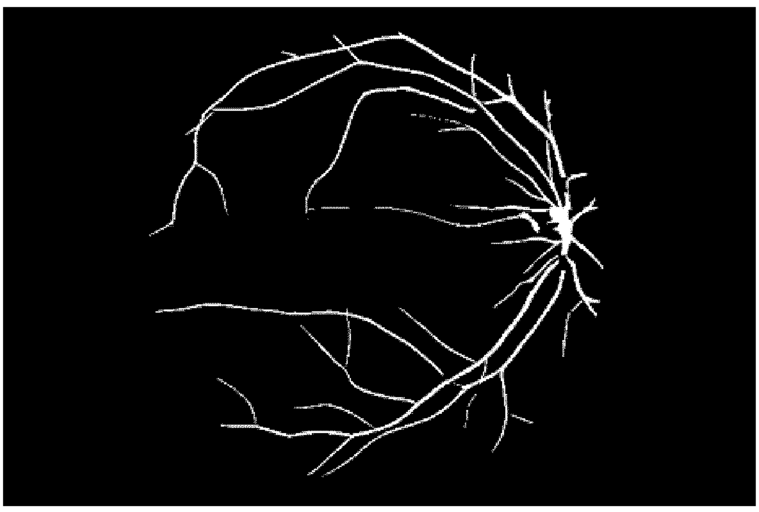
Figure 19:
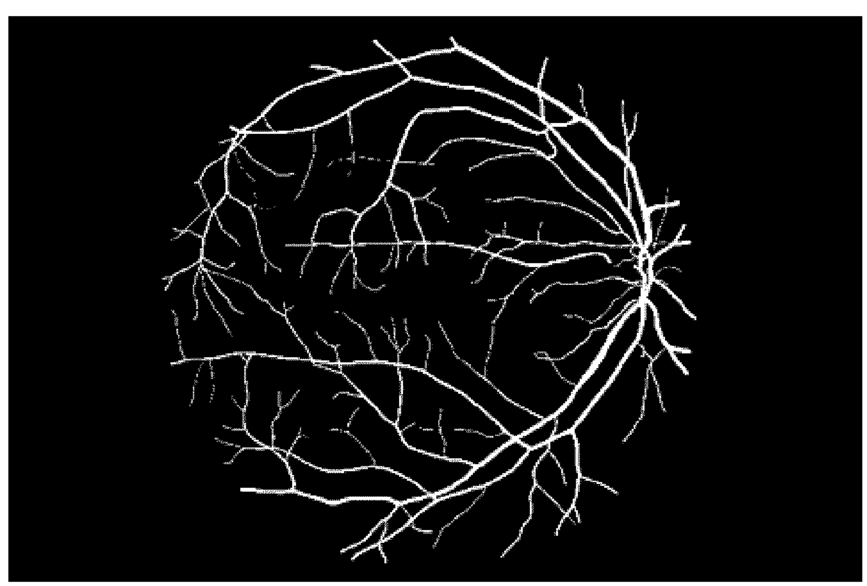
Figure 19:

For an average vessel thickness of 15 pixels, the thickness parameter of the Gabor filter may be set t=10 to begin with. Subsequently a separate training set was used to amend this parameter and their values to determine a combination of t and l that provides the best multiscale results. The training set for vessel detection was a combination of the publicly available datasets of HRF, DRHAGIS, and HeyMed, which provide hand-annotations. We ran the filters and run Receiver Operating Characteristics (ROC) analysis against that and the ground-truth (hand annotations). The parameters were adjusted to optimize for the highest area under the ROC curve. (FIG. 19, FIG. 21)

Example 5 Lesion Segmentation

The lesion detection method is developed and tested on a collection of narrow-field images. Those images were then hand-annotated by an ophthalmology expert. In total, 2,095 field-of-views were used to create annotated masks of the optic disc (869), exudates (554), hemorrhages (1,459) and microaneurysms (1,997). The main validation score use for training of the classifier is classification accuracy per pixel, per lesion and computed as the Dice Score.

The module uses the LinkNet architecture coupled with transfer learning done via a ResNet network as the encoder, where the final layer of the encoder was dropped and retrained with the hand-annotated retinal images.

The color image preprocessing step involves performing enhancement techniques such as histogram equalization to even out the dynamic range of the image. The module is trained with augmented data that consist of, but not limited to, rotation, flipping, changes of contrast, brightness and hue. There are four trained models each for detection of three types of lesions and the optic-nerve head. Each provide a separate probability map, and the algorithm works to resolve all overlapping areas and judges on which, if any of the lesions, are truly at that pixel location.

Figure 20:
FIG. 20: Segmentation of lesions as well as the ONH in an example retinal image. A) Original image B) Image with annotated lesions and ONH
Figure 20:
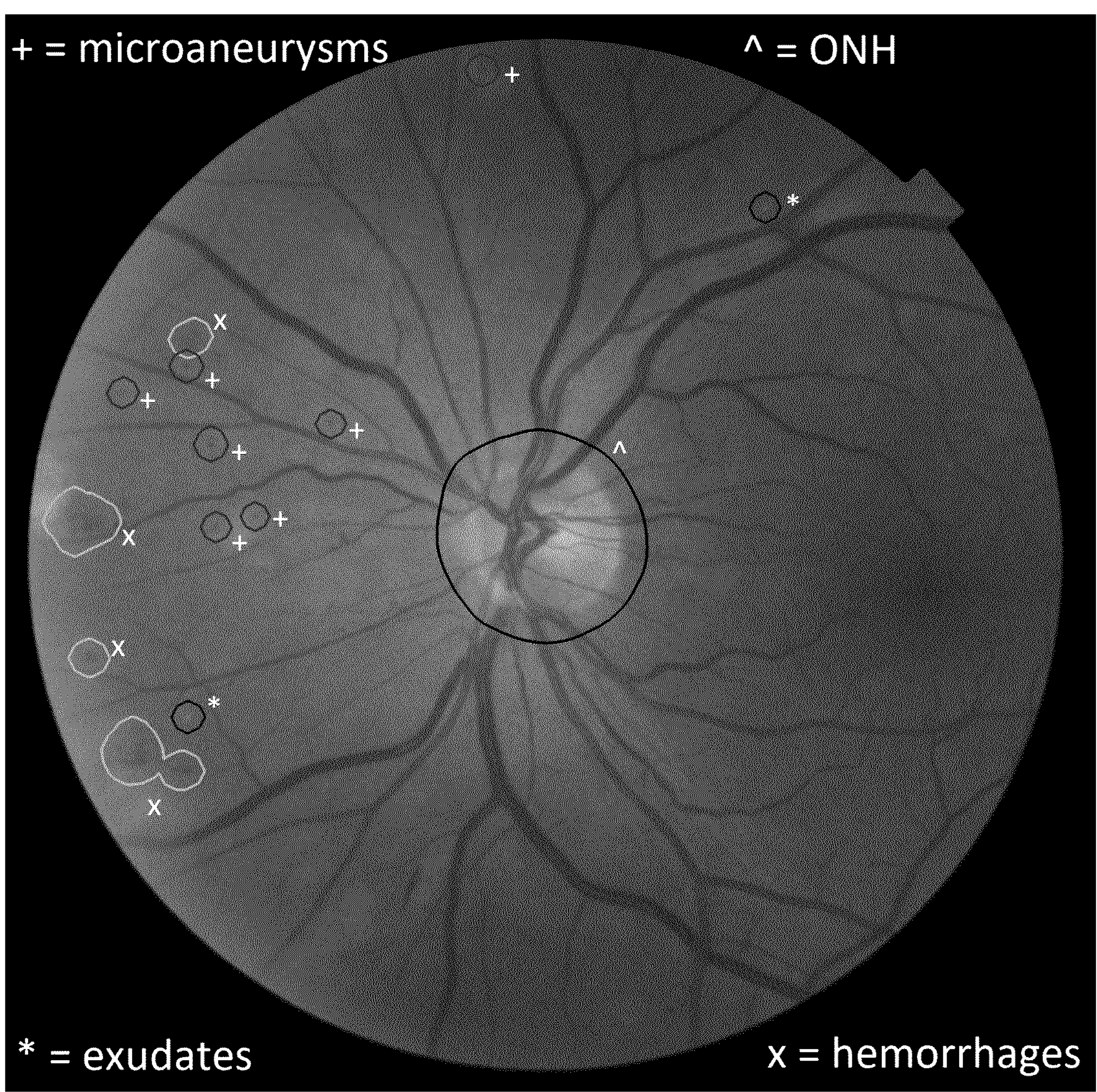
Figure 23:
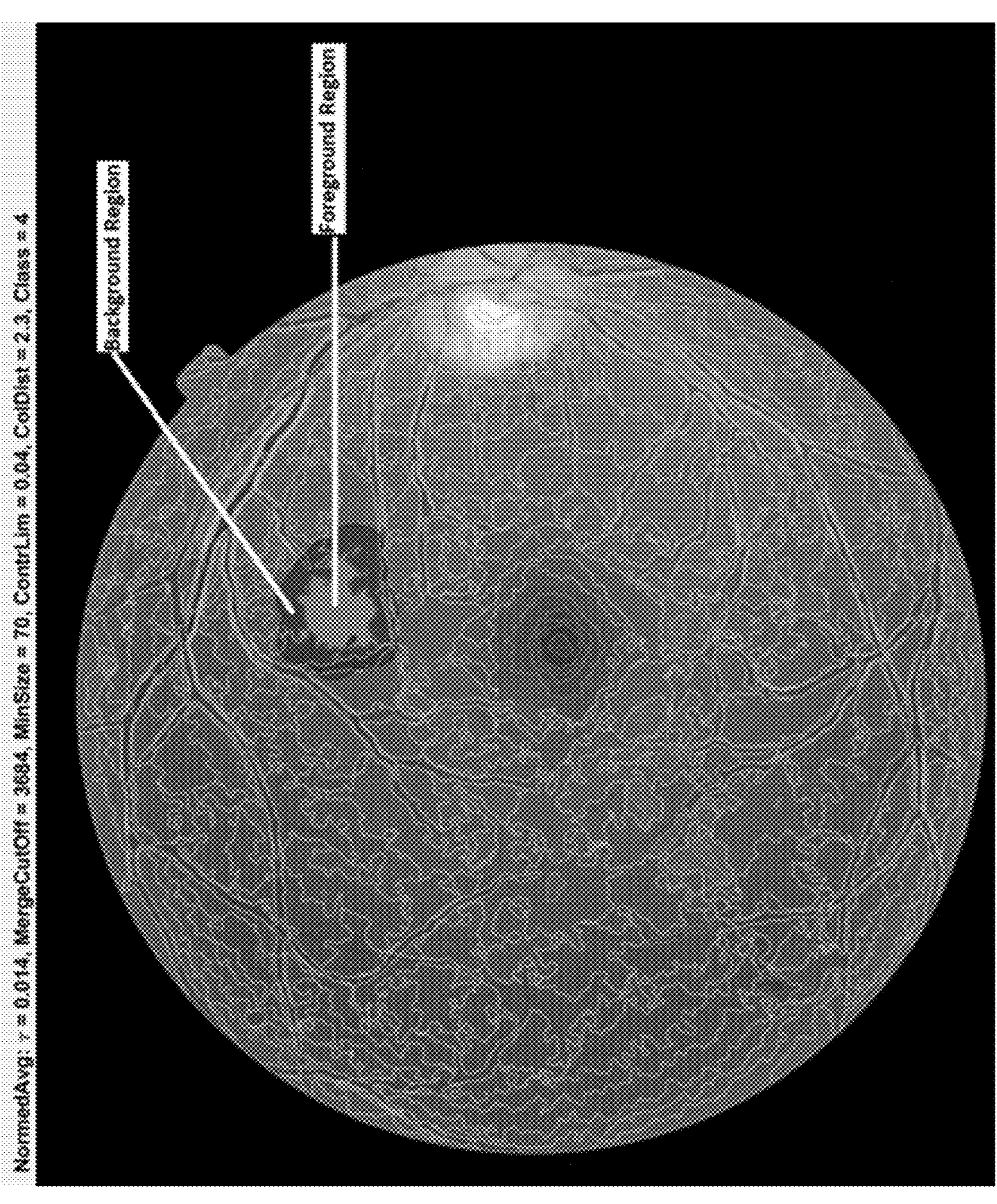
FIG. 23: Superpixel segmentation showing identified region and ribbon for contrast measurement.
Figure 24:
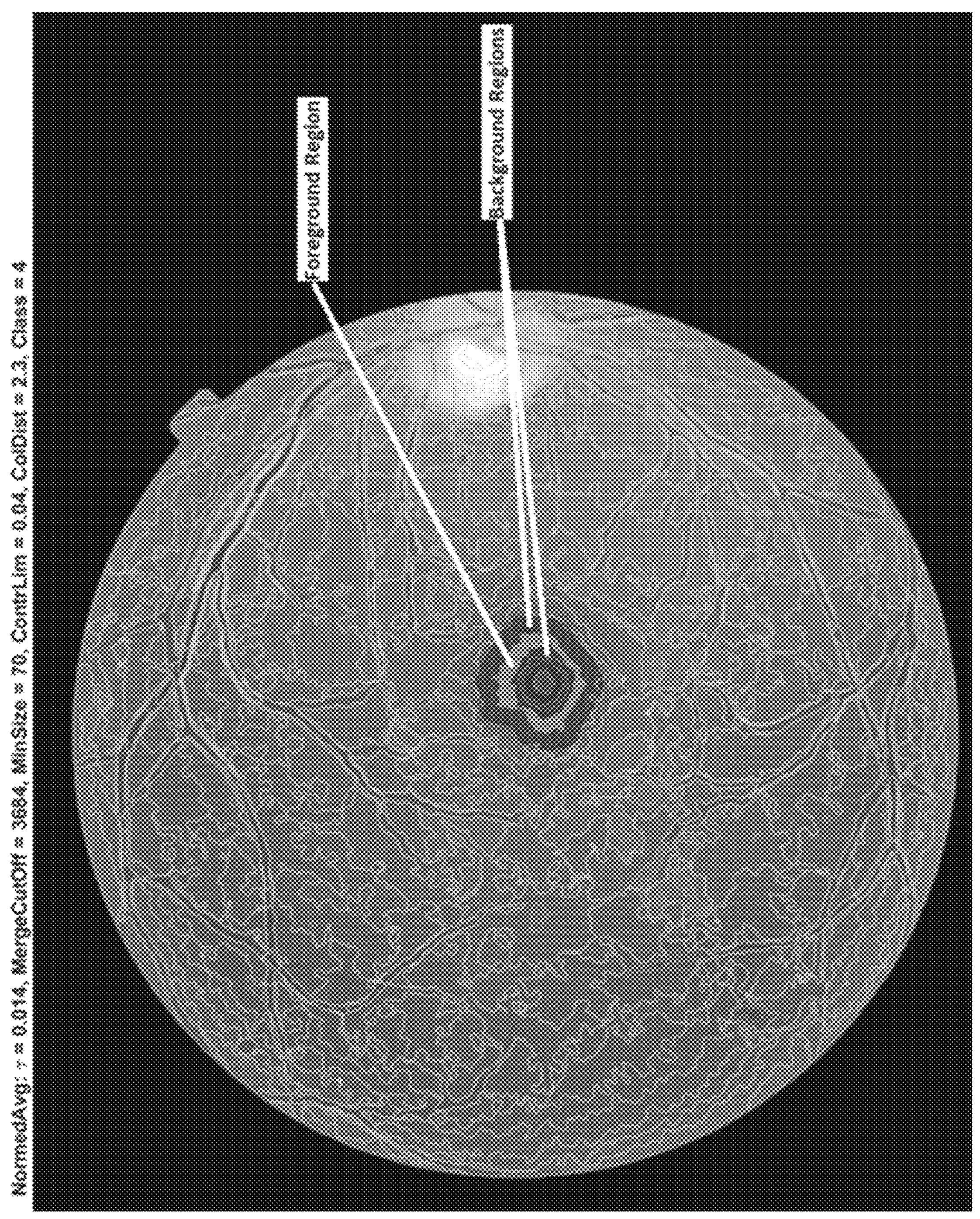
FIG. 24: Superpixel segmentation showing identified region with hole and ribbons for contrast measurement.
Figure 25:
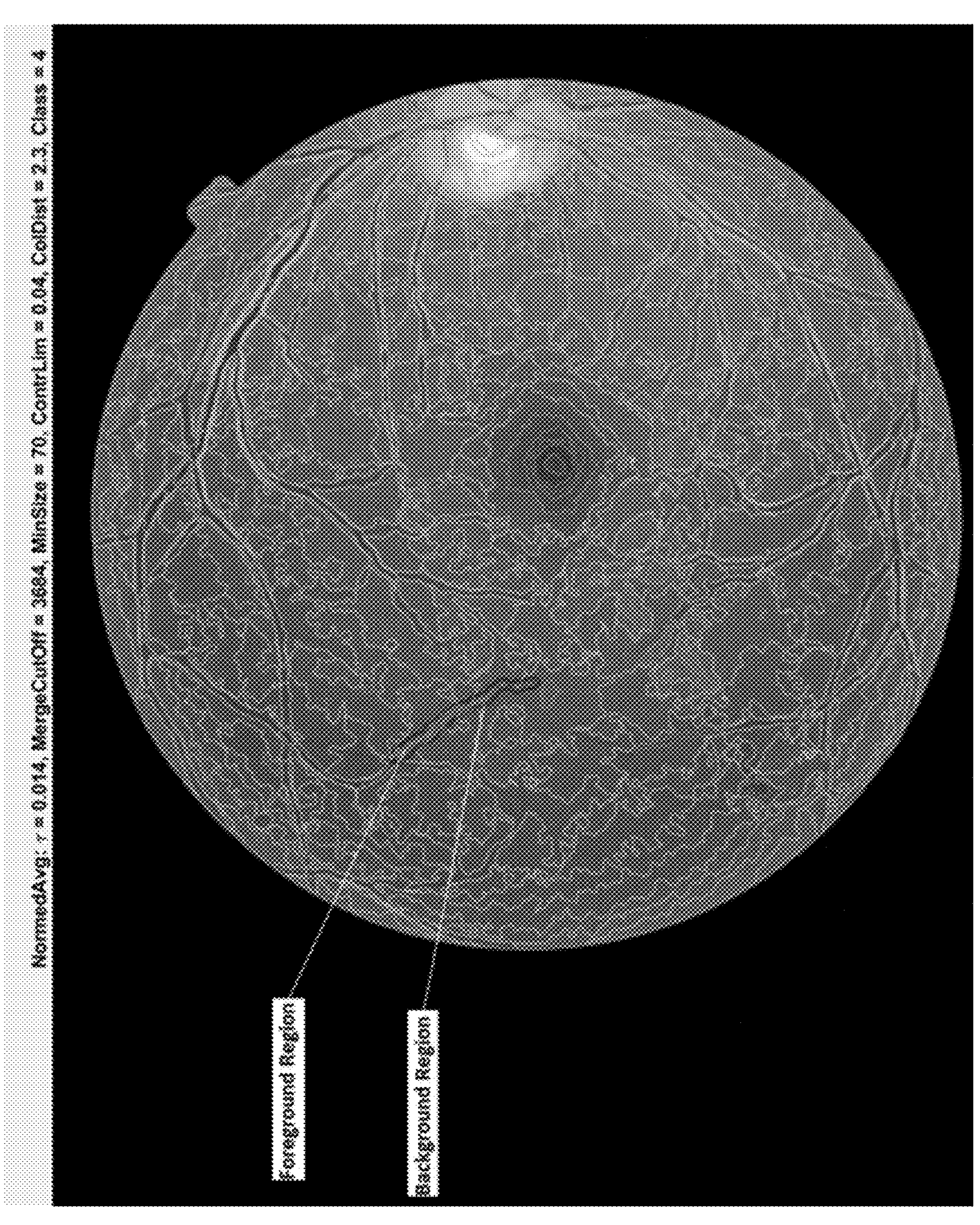
FIG. 25: Superpixel segmentation showing smaller identified region and proportionally smaller ribbon for contrast measurement.

Results are exemplified in FIG. 20

The invention further relates to the following items:

1. A computer-implemented method for classification of the quality of a vascular image, the method comprising the steps of:
   a. determining an image quality pattern of a vascular image based on a sharpness metric, a brightness metric, and a contrast metric of the vascular image, wherein the sharpness metric comprises determining of a spatial orientation and frequency variation of at least two areas in the vascular image, the brightness metric comprises comparing brightness values of the vascular image to a brightness reference image, and the contrast metric comprises determining a global contrast and determining the contrast of at least one vessel segment;
   b. comparing the image quality pattern obtained in (a) with a predefined image quality threshold pattern; and
   c. classifying the quality of the vascular image, wherein the image quality is classified based on the comparison of (b), in particular wherein the image quality is classified as having high quality if the image quality pattern is above the predefined image quality threshold pattern and wherein the image quality is classified as having low quality if the image quality pattern is below the predefined image quality threshold pattern.
2. A computer-implemented method for correction of the quality of a vascular image, the method comprising the steps of:
   i. retrieving a vascular image classified as having low quality according to the method of item 1;
   ii. comparing the sharpness metric, the brightness metric, and/or the contrast metric to an enhancement threshold pattern;
   iii. correcting the quality of a vascular image by employing, at least one technique selected from the group of focus correction, illumination correction, and contrast correction; wherein the selection of the technique is based on the comparison in step ii).
3. A computer-implemented method for classification of quality enhanceability of a vascular image, the method comprising the steps of:
   i. retrieving a vascular image that is corrected according to the method of item 2;
   ii. determining a corrected image quality pattern of the corrected vascular image based on a sharpness metric, a brightness metric, and a contrast metric of the corrected vascular image, wherein the sharpness metric comprises determining a spatial orientation and frequency variation of at least two areas in the vascular image, the brightness metric comprises comparing the brightness values of the corrected vascular image to a brightness reference image; and the contrast metric comprises determining global contrast and determining the contrast of at least one vessel segment;
   iii. comparing the difference between the corrected image quality pattern and the image quality pattern to an enhanceability threshold pattern; and
   iv. classifying quality enhanceability of a vascular image, wherein the vascular image is classified based on the comparison of (iii), in particular wherein the vascular image is classified as enhanceable if the difference in step iii) is above the enhanceability threshold pattern and wherein the vascular image is classified as not enhanceable if the difference in step iii) is below the enhanceability threshold pattern.
4. A computer-implemented method for classification of the quality of a vascular image, the method comprising the steps of:
   I. classifying the quality of a vascular image according to the method of item 1;
   II. correcting the quality of the vascular image according to the method of item 2;
   III. classifying the quality of the corrected vascular image according to the method of item 1; and
   IV. classifying the vascular image as having good quality if the vascular image and/or the corrected vascular image are/is classified as having high quality.
5. A computer-implemented method for classification of the quality of a vascular image, the method comprising the steps of:
   I. classifying the quality of a vascular image according to the method of item 1;
   II. correcting the quality of the vascular image according to the method of item 2;
   IV. classifying the quality of the corrected vascular image according to the method of item 1;
   V. classifying quality enhanceability of the corrected vascular image according to the method of item 3; and
   VI. a) classifying the vascular image as having good quality if the vascular image and/or the corrected vascular image are/is classified as having high quality; and
   b) classifying the vascular image as having enhanceable quality if the vascular image and the corrected vascular image are determined as having low quality and the corrected vascular image is classified as enhanceable in step V).

6. A computer-implemented method for classification of the quality of a vascular image, the method comprising the steps of:
   I. classifying the quality of a vascular image according to the method of item 1;
   II. correcting the quality of the vascular image according to the method of item 2;
   III. classifying the quality of the corrected vascular image according to the method of item 1;
   IV. classifying quality enhanceability of the corrected vascular image according to the method of item 3; and
   V. correcting the quality of the corrected vascular image according to the method of item 2 and repeating the steps II) to IV) if the corrected vascular image is classified as enhanceable in step IV); and
   VI. classifying the vascular image as having good quality if the vascular image and/or the corrected vascular image are/is classified as having high quality.
7. A computer-implemented method for obtainment of a quality enhanced vascular image, the method comprising the steps of:
   i. correcting the quality of a vascular image according to the method of item 2;
   ii. classifying quality in the corrected vascular image according to the method of item 1;
   iii. obtaining the quality enhanced vascular image by storing the corrected vascular image if the image is classified as having high quality in step ii).
8. A computer-implemented method for obtainment of a quality enhanced vascular image, the method comprising the steps of:
   i. correcting the quality of a vascular image according to the method of item 2;
   ii. classifying quality in the corrected vascular image according to the method of item 1;
   iii. classifying quality enhanceability of the corrected vascular image according to the method of item 3 if the corrected vascular image is classified as having low quality in step ii);
   iv. correcting the quality of the corrected vascular image according to the method of item 2 and repeating the steps 2) to 4) if the corrected vascular image is classified as enhanceable; and
   v. obtaining the quality enhanced vascular image by storing the corrected vascular image, if the image is classified as having high quality in step ii).
9. The computer-implemented method for classification according to any one of the items 1, 3 to 6, the computer-implemented method for correction according to item 2 or the computer-implemented method for obtainment according to item 7 or 8, wherein the brightness metric determination comprises segmentation and comparison thereof to a segment reference pattern.
10. The computer-implemented method for classification according to item 9, the computer-implemented method for correction according to item 9 or the computer-implemented method for obtainment according to item 9, wherein brightness metric comprises segmentation using a fuzzy membership function and/or region growing segmentation.
11. The computer-implemented method for classification according to any one of the items 1, 3 to 6, 9 or 10, the computer-implemented method for correction according to any one of the items 2, 9 or 10 or the computer-implemented method for obtainment according to any one of the items 7 to 10, wherein the brightness metric comprises determining a Fourier transformation and low-pass filtering.
12. The computer-implemented method for classification according to item 11, the computer-implemented method for correction according to item 11, or the computer-implemented method for obtainment according to item 11, wherein the brightness metric comprises determining at least one brightness metric selected from the group of angular spectral power density, image moment, histogram metric and radial spectral power density.
13. The computer-implemented method for classification according to any one of the items 1, 3 to 6, 9 to 12, the computer-implemented method for correction according to any one of the items 2, 9 to 12, or the computer-implemented method for obtainment according to any one of the items 7 to 12, wherein the contrast metric comprises determining a Jeffries Matusita Distance and/or Jensen-Shannon Divergence.
14. The computer-implemented method for classification according to any one of the items 1, 3 to 6, 9 to 13, the computer-implemented method for correction according to any one of the items 2, 9 to 13, or the computer-implemented method for obtainment according to any one of the items 7 to 13, wherein the contrast metric comprises determining superpixel segments, and/or lesion segments.
15. The computer-implemented method for classification according to item 14, the computer-implemented method for correction according to item 14, or the computer-implemented method for obtainment according to item 14, wherein the superpixel segments are non-overlapping clusters of pixels clustered based on color similarity and distance from a seed pixel.
16. The computer-implemented method for classification according to any one of the items 1, 3 to 6, 9 to 15, the computer-implemented method for correction according to any one of the items 2, 9 to 15, or the computer-implemented method for obtainment according to any one of the items 7 to 15, wherein the at least one vessel segment is determined using Gabor response.
17. The computer-implemented method for classification according to any one of the items 1, 3 to 6, 9 to 16, the computer-implemented method for correction according to any one of the items 2, 9 to 16, or the computer-implemented method for obtainment according to any one of the items 7 to 16, wherein the Laplacian Energy of at least one vessel segment and/or in at least one lesion segment is determined.
18. The computer-implemented method for classification according to any one of the items 1, 3 to 6, 9 to 17, the computer-implemented method for correction according to any one of the items 2, 9 to 17, or the computer-implemented method for obtainment according to any one of the items 7 to 17, wherein sharpness metric comprises determining a Fourier transformation and bandpass filtering.
19. The computer-implemented method for classification according to item 18, the computer-implemented method for correction according to item 18, or the computer-implemented method for obtainment according to item 18, wherein the sharpness comprises at least one sharpness metric selected from the group of L* channel metric, angular spectral power density, and radial spectral power density.

20. The computer-implemented method for classification according to item 19, the computer-implemented method for correction according to item 19, or the computer-implemented method for obtainment according to item 19, wherein the radial spectral power density is used to determine generalized extreme value distribution.

21. The computer-implemented method for classification according to item 19 or 20, the computer-implemented method for correction according to item 19 or 20, or the computer-implemented method for obtainment according to item 19 or 20, wherein the radial spectral power density is used to determine fractional power in at least one vessel segment.

22. The computer-implemented method for classification according to any of the items 19 to 21, the computer-implemented method for correction according to any of the items 19 to 21, or the computer-implemented method for obtainment according to any of the items 19 to 21, wherein the L* channel metric is an L* channel-derived Form Factor and/or L* channel-derived Laplacian Energy.

23. The computer-implemented method for classification according to any one of the items 1, 3 to 6, 9 to 22, the computer-implemented method for correction according to any one of the items 2, 9 to 22 or the computer-implemented method for obtainment according to any one of the items 7 to 22, wherein the vascular image is a retinal image.

24. The computer-implemented method for classification according to item 23, the computer-implemented method for correction according to item 23, or the computer-implemented method for obtainment according to item 23, wherein the sharpness metric, the brightness metric, and/or the contrast metric determined in a field of view mask area of the retinal image.

25. The computer-implemented method for classification according to item 24, the computer-implemented method for correction according to item 24 or the computer-implemented method for obtainment according to item 24, wherein the method comprises a step of extending the field of view mask area.

26. The computer-implemented method for classification according to any one of the items 23 to 25, the computer-implemented method for correction according to any one of the items 23 to 25, or the computer-implemented method for obtainment according to any one of the items 23 to 25, wherein the contrast metric comprises determining an ONH segmentation.

26. A storage device comprising the computer-implemented method for classification according to any one of the items 1, 3 to 6, 9 to 26, the computer-implemented method for correction according to any one of the items 2, 9 to 26 and/or the computer-implemented method for obtainment according to any one of the items 7 to 26.

27. A server comprising the storage device of item 26 and a network connection for receiving data indicative for the vascular image.

28. A system for capturing a quality-classified vascular image, wherein the system comprises
   a) at least one processing device and the storage device of item 26; and/or
   b) a network connection to the server of item 27.

The invention claimed is:

1. A computer-implemented method executed by at least one processor of for classification or enhancement of the quality of a vascular image, the method comprising:
(a) providing or acquiring, by at least one processor, a vascular image,
(b) determining an image quality pattern of a vascular image based on a sharpness metric, a brightness metric, and a contrast metric of the vascular image, wherein the sharpness metric comprises determining in at least two areas in the vascular image a spatial orientation of edges and frequency variation, wherein frequency variation is the variation in at least a part of the frequency domain of the image, wherein the brightness metric is indicative of brightness-derived quality parameters and comprises determining non-uniformity of the brightness of the image, and wherein the contrast metric comprises determining a global contrast and determining the contrast of at least one vessel segment;
(c) comparing the image quality pattern obtained in (b) with a predefined image quality threshold pattern, wherein the quality threshold pattern comprises at least one threshold and/or a classification model comprising or consisting of a set of weights; and
(d) classifying the quality of the vascular image, wherein the image quality is classified based on the comparison of (c) and wherein the image quality is classified as having high quality if the image quality pattern is above the predefined image quality threshold pattern and wherein the image quality is classified as having low quality if the image quality pattern is below the predefined image quality threshold pattern; and
(e) based on the image quality classification of step (d), determining whether an image is further processed or excluded from further processing or whether the process of acquiring the vascular image is to be corrected or repeated.

2. The computer-implemented method according to claim 1, which further comprises the steps of:
(i) retrieving a vascular image classified as having low quality according to the method of claim 1;
(ii) retrieving or determining a sharpness metric, a brightness metric, and a contrast metric of the vascular image, wherein the sharpness metric comprises determining a spatial orientation and frequency variation of at least two areas in the vascular image, the brightness metric comprises comparing brightness values of the vascular image to a brightness reference image, and the contrast metric comprises determining a global contrast and determining the contrast of at least one vessel segment;
(iii) comparing the sharpness metric, the brightness metric, and/or the contrast metric to an enhancement threshold pattern;
(iv) correcting the quality of the vascular image by employing, at least one technique selected from the group of focus correction, illumination correction, and contrast correction; wherein the selection of the technique is based on the comparison in step (iii).

3. The computer-implemented method according to claim 2, which further comprises the steps of:
(v) retrieving a vascular image that is corrected according to the method of claim 2;
(vi) determining a corrected image quality pattern of the corrected vascular image based on a sharpness metric, a brightness metric, and a contrast metric of the corrected vascular image, wherein the sharpness metric comprises determining a spatial orientation and frequency variation of at least two areas in the vascular image, the brightness metric comprises comparing the brightness values of the corrected vascular image to a brightness reference image; and the contrast metric comprises determining global contrast and determining the contrast of at least one vessel segment;

(vii) comparing the difference between the corrected image quality pattern and the image quality pattern to an enhanceability threshold pattern; and (viii) classifying quality enhanceability of the vascular image, wherein the vascular image is classified based on the comparison of (vii) and wherein the vascular image is classified as enhanceable if the difference in step (vii) is above the enhanceability threshold pattern and wherein the vascular image is classified as not enhanceable if the difference in step (vii) is below the enhanceability threshold pattern.

4. The computer-implemented method according to claim 3, which further comprises:

correcting the quality of the corrected vascular image if the corrected vascular image is classified as enhanceable in step (viii) and repeating the correction of the corrected vascular image quality image until the corrected vascular image is not classified as enhanceable.

5. The computer-implemented method according to claim 1, wherein the brightness metric determination comprises the steps of:

a) segmentation of the vascular image;

b) comparison of a segment to a segment reference pattern; and c) determining based whether the brightness of the segment is indicative of anatomical brightness or quality-related brightness alterations.

6. The computer-implemented method for classification according to claim 5, wherein the brightness metric comprises the segmentation of the vascular image comprises using a fuzzy membership function and/or region growing segmentation.

7. The computer-implemented method according to claim 1, wherein the brightness metric comprises homomorphic filtering.

8. The computer-implemented method according to claim 1, wherein the brightness metric comprises comparing at least part of the brightness metrics of the vascular image to a brightness reference image.

9. The computer-implemented method according to claim 1, wherein the brightness metric comprises determining a Fourier transformation of the vascular image, wherein a frequencies above a Fourier transformation frequency threshold contribute more to the brightness metric than the frequencies below the Fourier transformation frequency threshold.

10. The computer-implemented method according to claim 1, wherein determining the contrast metric comprises comparison of the intensity distributions of a foreground and a background region.

11. The computer-implemented method according to claim 10, wherein the foreground region of the vessel contrast are the vessels and the background regions of the vessel contrast are regions adjacent to the vessels, wherein each foreground region has a corresponding background region with at least 50% of the area of the foreground region.

12. The computer-implemented method according to claim 10, wherein determining the contrast metric comprises determining a Jeffries Matusita Distance and/or Jensen-Shannon Divergence between the foreground and the background region.

13. The computer-implemented method according to claim 1, wherein global contrast is determined using at least 50% of the pixels of the image.

14. The computer-implemented method according to claim 1, wherein determining the contrast metric comprises determining superpixel segments, and/or lesion segments, and wherein the superpixel segments are non-overlapping clusters of pixels clustered based on a) color similarity or intensity similarity and b) distance from a seed pixel.

15. The computer-implemented method according to claim 14, wherein the foreground regions are superpixel segments and the background regions are regions adjacent to the foreground region, wherein each foreground region has a corresponding background region with at least 50% of the area of the foreground region.

16. The computer-implemented method according to claim 1, wherein the sharpness metric comprises determining a Fourier transformation of the vascular image, wherein a band of frequency of the fourier transform contributes more to the sharpness metric than the frequencies higher and lower than the band of frequency of the fourier transform.

17. The computer-implemented method for classification according to claim 16, wherein the sharpness comprises at least one sharpness metric selected from the group of L* channel metric, angular spectral power density, and radial spectral power density, wherein the L* channel the L* channel of the CIELAB colour space and wherein the angular spectral power density and radial spectral power density are determined from the frequency response on the vascular image.

18. The computer-implemented method according to claim 17, wherein the radial spectral power density is used to determine generalized extreme value distribution and/or is used to determine fractional power in at least one vessel segment.

19. The computer-implemented method according to claim 17, wherein the L* channel metric is an L* channel-derived Form Factor and/or L* channel-derived Laplacian Energy, wherein the L* channel-derived Form Factor is a measure of the relative L* channel variation between a 2D spatial signal and its first and second derivatives and wherein the Laplacian Energy is a measure of content in a high-frequency band of the image.

20. The computer-implemented method according to claim 1, wherein the vascular image is a retinal image.

* * * * *